United States Patent
Minotani et al.

(10) Patent No.: US 12,225,518 B2
(45) Date of Patent: Feb. 11, 2025

(54) BASE STATION, TERMINAL, AND COMMUNICATION METHOD

(71) Applicant: Panasonic Intellectual Property Corporation of America, Torrance, CA (US)

(72) Inventors: Jun Minotani, Ishikawa (JP); Takashi Iwai, Ishikawa (JP); Tomofumi Takata, Ishikawa (JP); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 532 days.

(21) Appl. No.: 17/611,081

(22) PCT Filed: May 1, 2020

(86) PCT No.: PCT/JP2020/018461
§ 371 (c)(1),
(2) Date: Nov. 12, 2021

(87) PCT Pub. No.: WO2020/241183
PCT Pub. Date: Dec. 3, 2020

(65) Prior Publication Data
US 2022/0240269 A1 Jul. 28, 2022

(30) Foreign Application Priority Data
May 29, 2019 (JP) .................. 2019-100587

(51) Int. Cl.
*H04W 72/121* (2023.01)
*H04W 72/20* (2023.01)
*H04W 84/12* (2009.01)

(52) U.S. Cl.
CPC ......... *H04W 72/121* (2013.01); *H04W 72/20* (2023.01); *H04W 84/12* (2013.01)

(58) Field of Classification Search
CPC ... H04W 72/121; H04W 72/20; H04W 84/12; H04W 4/08; H04W 16/28; H04B 7/0426;
(Continued)

(56) References Cited

U.S. PATENT DOCUMENTS

2016/0204969 A1 7/2016 Zhu et al.
2017/0078973 A1* 3/2017 Ohwatari ............ H04W 52/247
(Continued)

FOREIGN PATENT DOCUMENTS

CN 108811156 A 11/2018
DE 112016002189 T5 1/2018
(Continued)

OTHER PUBLICATIONS

Benjebbour et al., "Concept and Practical Considerations of Non-orthogonal Multiple Access (NOMA) for Future Radio Access," Radio Access Network Development Department, NTT DOCOMO, Inc., 2013, 5 pages.
(Continued)

*Primary Examiner* — Kwang B Yao
*Assistant Examiner* — Syed M Bokhari
(74) *Attorney, Agent, or Firm* — Seed IP Law Group LLP

(57) ABSTRACT

This base station is provided with: a control circuit that generates information relating to a terminal group among a plurality of terminals, said terminal group being a target of transmission by non-orthogonal multiple access; and a transmission circuit that transmits the information relating to the terminal group during a period in which control information addressed to the plurality of terminals is transmitted.

13 Claims, 24 Drawing Sheets

(58) Field of Classification Search
CPC ...... H04B 7/0452; H04B 7/0456; H04B 7/06; H04L 27/26
USPC ........................................................ 370/312
See application file for complete search history.

(56) References Cited

U.S. PATENT DOCUMENTS

| | | | |
|---|---|---|---|
| 2018/0019843 A1* | 1/2018 | Papasakellariou | H04L 1/1854 |
| 2018/0110070 A1 | 4/2018 | Yoshimura et al. | |
| 2018/0123855 A1 | 5/2018 | Yoshizawa | |
| 2018/0278454 A1* | 9/2018 | Islam | H04L 1/0038 |
| 2019/0044591 A1 | 2/2019 | Sano et al. | |
| 2019/0363843 A1 | 11/2019 | Gordaychik | |
| 2020/0153672 A1* | 5/2020 | Choi | H04L 5/0092 |
| 2020/0154408 A1 | 5/2020 | Wang et al. | |
| 2020/0236698 A1 | 7/2020 | Takeda et al. | |
| 2020/0295891 A1* | 9/2020 | Koh | H04L 5/0037 |
| 2021/0084621 A1* | 3/2021 | Kim | H04L 5/0094 |
| 2021/0259020 A1* | 8/2021 | Li | H04W 72/044 |

FOREIGN PATENT DOCUMENTS

| | | |
|---|---|---|
| EP | 3 592 028 A1 | 1/2020 |
| JP | 2018-506898 A | 3/2018 |
| WO | WO 2016167310 A1 | 10/2016 |
| WO | 2017/135302 A1 | 8/2017 |
| WO | 2018/158923 A1 | 9/2018 |

OTHER PUBLICATIONS

International Search Report, mailed Jul. 28, 2020, for International Application No. PCT/JP2020/018461, 6 pages. (with English Translation).
Khorov et al., "Experimental Study of NOMA/SOMA in Wi-Fi," IEEE 802.11-18/1957r2, Mar. 11, 2019, 27 pages.
Indian Examination Report dated Aug. 16, 2023, for the corresponding Indian Patent Application No. 202127051987, 6 pages.
Indian Hearing Notice dated Jul. 16, 2024, for the corresponding Indian Patent Application No. 202127051987, 2 pages.

* cited by examiner

| 8 bits indices | #1 | #2 | #3 | #4 | #5 | #6 | #7 | #8 | #9 | NOMA bit examples |
|---|---|---|---|---|---|---|---|---|---|---|
| 00010$y_2y_1y_0$ | 52 | | | 52 | – | | 106 | | | Case of including single 106-tone or higher RU<br><br>0: RU includes no NOMA group<br>1: RU includes NOMA group<br>2, 3: Reserved |
| 00011$y_2y_1y_0$ | | 106 | | | – | 52 | | 52 | | |
| 00100$y_2y_1y_0$ | 26 | 26 | 26 | 26 | 26 | | 106 | | | |
| 00101$y_2y_1y_0$ | 26 | 26 | | 52 | 26 | | 106 | | | |
| 00110$y_2y_1y_0$ | 52 | | 26 | 26 | 26 | | 106 | | | |
| 00111$y_2y_1y_0$ | 52 | | | 52 | 26 | | 106 | | | |
| 01000$y_2y_1y_0$ | | 106 | | | 26 | 26 | 26 | 26 | 26 | |
| 01001$y_2y_1y_0$ | | 106 | | | 26 | 26 | 26 | 52 | | |
| 01010$y_2y_1y_0$ | | 106 | | | 26 | 52 | | 26 | 26 | |
| 01011$y_2y_1y_0$ | | 106 | | | 26 | 52 | | 52 | | |
| 11000$y_2y_1y_0$ | | | | | 242 | | | | | |
| 11001$y_2y_1y_0$ | | | | | 484 | | | | | |
| 11011$y_2y_1y_0$ | | | | | 996 | | | | | |
| 0110$y_1y_0y_1y_0$ | | 106 | | | – | | 106 | | | Case of including two 106-tone or higher RUs<br><br>0: Neither RU includes NOMA group<br>1: Right RU includes NOMA group<br>2: Left RU includes NOMA group<br>3: Both RUs include NOMA group |
| | | 106 | | | – | | 106 | | | |
| | | 106 | | | 26 | | 106 | | | |
| 10$y_2y_1y_0y_2y_1y_0$ | | 106 | | | 26 | | 106 | | | |
| | | 106 | | | 26 | | 106 | | | |

FIG. 12

| 8 bits indices | #1 | #2 | #3 | #4 | #5 | #6 | #7 | #8 | #9 | NOMA bit examples |
|---|---|---|---|---|---|---|---|---|---|---|
| 00010y₂y₁y₀ | 52 | | 52 | | – | | | | | |
| 00011y₂y₁y₀ | | 106 | | | – | | 106 | | 52 | Case of including single 106-tone or higher RU<br><br>0: RU includes no NOMA group<br>1: RU includes NOMA group with the number of NOMA users = 2<br>2, 3: Reserved |
| 00100y₂y₁y₀ | 26 | 26 | 26 | 26 | 26 | 52 | 106 | | | |
| 00101y₂y₁y₀ | 26 | 26 | | 52 | 26 | | 106 | | | |
| 00110y₂y₁y₀ | 52 | | 26 | 26 | 26 | | 106 | | | |
| 00111y₂y₁y₀ | | 52 | 52 | | 26 | | 106 | | | |
| 01000y₂y₁y₀ | | 106 | | | 26 | 26 | 26 | 26 | 26 | |
| 01001y₂y₁y₀ | | 106 | | | 26 | 26 | | 52 | 26 | |
| 01010y₂y₁y₀ | | 106 | | | 26 | 52 | | 26 | 26 | |
| 01011y₂y₁y₀ | | 106 | | | 26 | 52 | | | 52 | |
| 11000y₂y₁y₀ | | | | | 242 | | | | | |
| 11001y₂y₁y₀ | | | | | 484 | | | | | |
| 11011y₂y₁y₀ | | | | | 996 | | | | | |
| 0110y₁y₀y₁y₀ | | 106 | 106 | | – | | 106 | | | Case of including two 106-tone or higher RUs<br><br>0: Neither RU includes NOMA group<br>1: Right RU includes NOMA group with the number of NOMA users = 2<br>2: Left RU includes NOMA group with the number of NOMA users = 2<br>3: Both RUs include NOMA group with the number of NOMA users = 2 |
| | | 106 | 106 | | – | | 106 | | | |
| 10y₂y₁y₀y₂y₁y₀ | | 106 | | | 26 | 26 | 106 | | | |
| | | 106 | | | 26 | 26 | 106 | | | |
| | | 106 | | | 26 | 26 | 106 | | | |

FIG. 13

| 8 bits indices | #1 | #2 | #3 | #4 | #5 | #6 | #7 | #8 | #9 |
|---|---|---|---|---|---|---|---|---|---|
| 00010000 | 52 | 52 | 52 | 52 | - | 106 | (NUMBER OF MU MULTIPLEXES=1, NUMBER OF NOMA USERS=0) | | |
| 00010001 | 52 | 52 | 52 | 52 | - | 106 | (NUMBER OF MU MULTIPLEXES=2, NUMBER OF NOMA USERS=0) | | |
| 00010010 | 52 | 52 | 52 | 52 | - | 106 | (NUMBER OF MU MULTIPLEXES=3, NUMBER OF NOMA USERS=0) | | |
| 00010011 | 52 | 52 | 52 | 52 | - | 106 | (NUMBER OF MU MULTIPLEXES=4, NUMBER OF NOMA USERS=0) | | |
| 00010100 | 52 | 52 | 52 | 52 | - | 106 | (NUMBER OF MU MULTIPLEXES=5, NUMBER OF NOMA USERS=0) | | |
| 00010101 | 52 | 52 | 52 | 52 | - | 106 | (NUMBER OF MU MULTIPLEXES=6, NUMBER OF NOMA USERS=0) | | |
| 00010110 | 52 | 52 | 52 | 52 | - | 106 | (NUMBER OF MU MULTIPLEXES=7, NUMBER OF NOMA USERS=0) | | |
| 00010111 | 52 | 52 | 52 | 52 | - | 106 | (NUMBER OF MU MULTIPLEXES=8, NUMBER OF NOMA USERS=0) | | |
| | 52 | 52 | 52 | 52 | - | 106 | (NUMBER OF MU MULTIPLEXES=1, NUMBER OF NOMA USERS=2) | | |
| | 52 | 52 | 52 | 52 | - | 106 | (NUMBER OF MU MULTIPLEXES=2, NUMBER OF NOMA USERS=2) | | |
| | 52 | 52 | 52 | 52 | - | 106 | (NUMBER OF MU MULTIPLEXES=3, NUMBER OF NOMA USERS=2) | | |
| | 52 | 52 | 52 | 52 | - | 106 | (NUMBER OF MU MULTIPLEXES=4, NUMBER OF NOMA USERS=2) | | |
| | 52 | 52 | 52 | 52 | - | 106 | (NUMBER OF MU MULTIPLEXES=5, NUMBER OF NOMA USERS=2) | | |
| | 52 | 52 | 52 | 52 | - | 106 | (NUMBER OF MU MULTIPLEXES=6, NUMBER OF NOMA USERS=2) | | |
| | 52 | 52 | 52 | 52 | - | 106 | (NUMBER OF MU MULTIPLEXES=7, NUMBER OF NOMA USERS=2) | | |
| 00011000 | 52 | 52 | 52 | 52 | - | 106 | (NUMBER OF MU MULTIPLEXES=8, NUMBER OF NOMA USERS=2) | | |

REDUCED

FIG. 15

| STA ID | Spatial Configuration | MCS | Reserved | Coding | Beam ID | Tx Power Table | Tx Power Offset ID |

FIG. 16

| | Number of NOMA Users | | |
|---|---|---|---|
| Tx Power Table bits | 0 (Non-NOMA User) | 2 | 3 |
| 00 | $\alpha_1=0$ | $\alpha_1=0.90$<br>$\alpha_2=0.10$ | $\alpha_1=0.80$<br>$\alpha_2=0.15$<br>$\alpha_3=0.05$ |
| 01 | -- | $\alpha_1=0.80$<br>$\alpha_2=0.20$ | $\alpha_1=0.70$<br>$\alpha_2=0.20$<br>$\alpha_3=0.10$ |
| 10 | -- | $\alpha_1=0.70$<br>$\alpha_2=0.30$ | $\alpha_1=0.60$<br>$\alpha_2=0.35$<br>$\alpha_3=0.05$ |
| 11 | -- | $\alpha_1=0.60$<br>$\alpha_2=0.40$ | $\alpha_1=0.60$<br>$\alpha_2=0.30$<br>$\alpha_3=0.10$ |

FIG. 17

| STA ID | Spatial Configuration | MCS | Reserved | Coding | Beam ID | Tx Power Offset |

FIG. 18

| Tx Power Offset bits | Tx Power Offset |
|---|---|
| 0000 | 1 |
| 0001 | 0.9 |
| 0010 | 0.8 |
| 0011 | 0.7 |
| 0100 | 0.6 |
| 0101 | 0.5 |
| 0110 | 0.4 |
| 0111 | 0.3 |
| 1000 | 0.2 |
| 1001 | 0.1 |
| 1010 – 1111 | Reserved |

FIG. 19

BASE STATION, TERMINAL, AND COMMUNICATION METHOD

TECHNICAL FIELD

The present disclosure relates to a base station, a terminal, and a communication method.

BACKGROUND ART

Topic Interest Group (TIG) and Study Group (SG) have been developing the technical specification of IEEE 802.11be (hereinafter, referred to as "11be") as the successor standard of the Institute of Electrical and Electronics Engineers (IEEE) 802.11ax (hereinafter, referred to as "11ax"), which is a standard of IEEE 802.11.

In 11be, non-orthogonal multiplexing (non-orthogonal multiple access (NOMA)), for example, has been discussed for a multiplexing scheme (or a multiple access scheme) to improve spectrum efficiency (e.g., see Non Patent Literature (hereinafter, referred to as "NPL") 1).

CITATION LIST

Non Patent Literature

NPL 1
IEEE 802.11-18/1957r2. Experimental Study of NOMA/SOMA in Wi-Fi, Mar. 8, 2019
NPL 2
A. Benjebbour et al., Concept and Practical Considerations of Non-orthogonal Multiple Access (NOMA) for Future Radio Access, 2013

SUMMARY OF INVENTION

There is scope for further study, however, on methods of controlling non-orthogonal multiplexing processing in radio communication, such as a wireless local area network (WLAN).

One non-limiting and exemplary embodiment facilitates providing a base station, a terminal, and a communication method each capable of appropriately controlling non-orthogonal multiplexing processing.

A terminal according to an embodiment of the present disclosure includes: control circuitry, which, in operation, generates information on a terminal group among a plurality of terminals, the terminal group being a target of transmission by non-orthogonal multiplexing; and transmission circuitry, which, in operation, transmits the information on the terminal group during a period for transmitting control information addressed to the plurality of terminals.

It should be noted that general or specific embodiments may be implemented as a system, an apparatus, a method, an integrated circuit, a computer program, a storage medium, or any selective combination thereof.

According to an exemplary embodiment of the present disclosure, it is possible to appropriately control non-orthogonal multiplexing processing.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 12 illustrates an example of Resource Unit (RU) allocation information according to Embodiment 2;

FIG. 13 illustrates another example of the RU allocation information according to Embodiment 2;

FIG. 15 illustrates exemplary RU allocation information according to Method 2-2 in Embodiment 2;

FIG. 16 illustrates an exemplary format of STA information according to Method 3-1 in Embodiment 3;

FIG. 17 illustrates an exemplary Tx Power Table according to Method 3-1 in Embodiment 3;

FIG. 18 illustrates an exemplary format of STA information according to Method 3-2 in Embodiment 3;

FIG. 19 illustrates exemplary Tx Power Offsets according to Method 3-2 in Embodiment 3;

DESCRIPTION OF EMBODIMENTS

Hereinafter, embodiments of the present disclosure will be described in detail with reference to the accompanying drawings.

[Multi-User (MU) Transmissions]

For example, 11ax supports MU transmissions. The MU transmissions include, for example, DL MU-MIMO and DL Orthogonal Frequency Division Multiple Access (DL OFDMA).

In the case of DL MU-MIMO or DL OFDMA, an Access Point (AP; or referred to as a "base station") indicates control information to each terminal (e.g., also referred to as a station (STA)) using control information (e.g., so called SIG-B or a SIG-B field) of a preamble included in a DL MU PPDU, for example.

Figure 1:
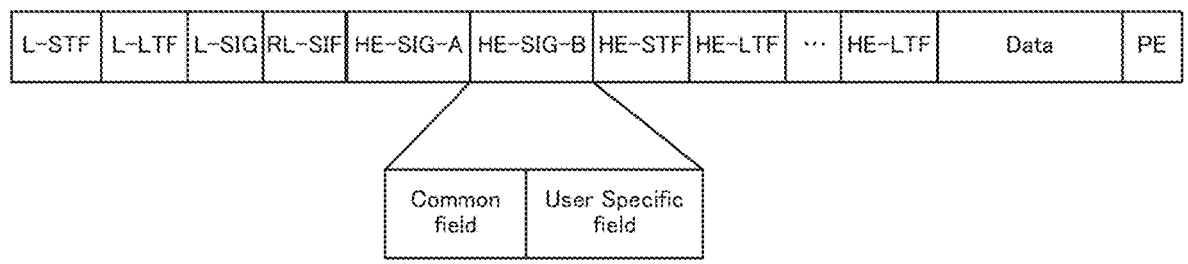
FIG. 1 illustrates an exemplary DL Multiuser Physical layer convergence procedure Protocol Data Unit (DL MU PPDU) format.

FIG. 1 illustrates an exemplary format of HE-SIG-B (hereinafter, simply referred to as "SIG-B") in the DL MU PPDU indicating DL MU transmissions in 11ax.

As illustrated in FIG. 1, SIG-B includes a "Common field" including information common to a plurality of users (i.e., STAs) (e.g., referred to as "common information"), and a "User Specific field" including specific information for users (e.g., referred to as "STA information", "STA information portion", "user information", or "user specific information"). In the Common field, for example, an RU allocated to each user and the number of multiplexed users in the RU are indicated in a Resource Unit (RU) Allocation subfield. Further, the User Specific field includes, for example, one or more User Block fields (not illustrated). Each User Block field is a field resulting from encoding a User field of one or two users with a Block Check Character (BCC), for example.

Figure 2:
FIG. 2 illustrates an exemplary User field format.

FIG. 2 illustrates an exemplary configuration of the User field of SIG-B. As illustrated in FIG. 2, the User field includes information such as an "STA ID subfield" indicating an STA identifier, a "Spatial Configuration subfield" indicating special stream allocation information, a "Modulation and channel Coding Scheme (MCS) subfield" indicating a modulation and coding scheme, and a "Coding subfield" indicating a coding method, for example. Further, the alignment sequence of the User fields respectively corresponding to STAs in the User Specific field corresponds to, for example, the allocated RUs included in the RU Allocation subfield in the Common field (e.g., the alignment sequence of users to which the RUs are allocated in the RU Allocation subfield).

[NOMA]

NOMA is a multiplexing scheme of transmitting a signal obtained by non-orthogonally multiplexing a plurality of signals on the same frequency resource at the same time (hereinafter referred to as a "NOMA signal").

Figure 3:
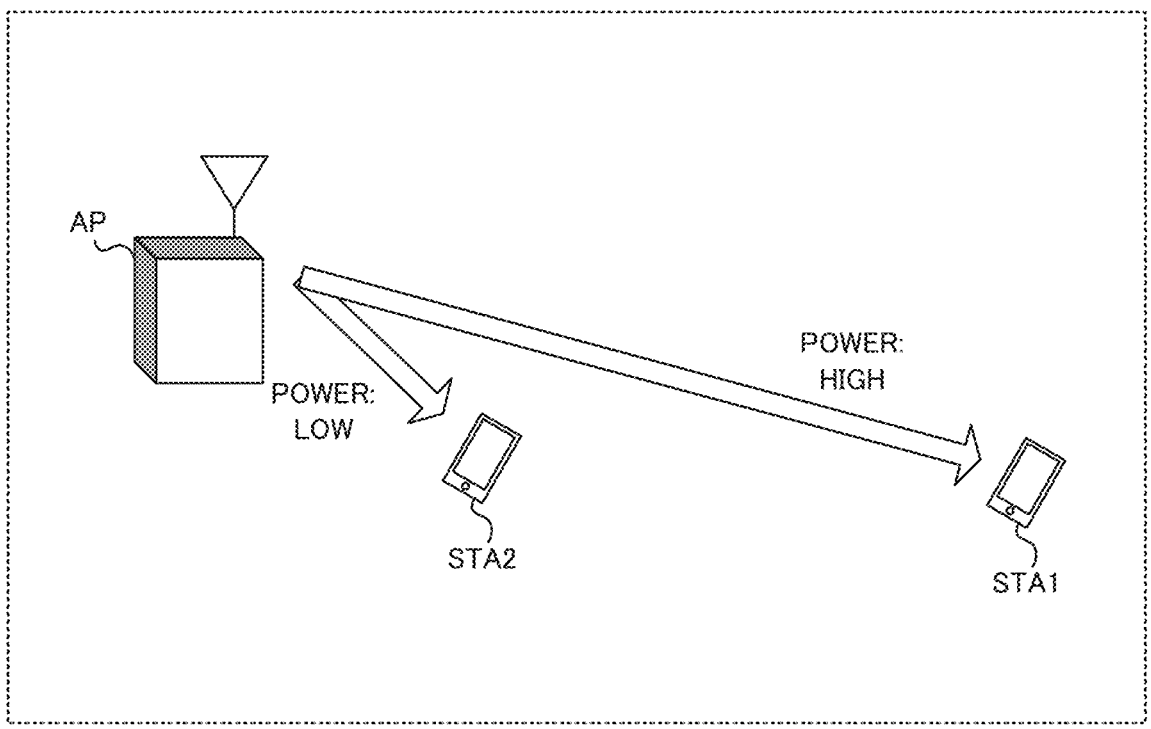
FIG. 3 illustrates an exemplary NOMA operation.
Figure 4:
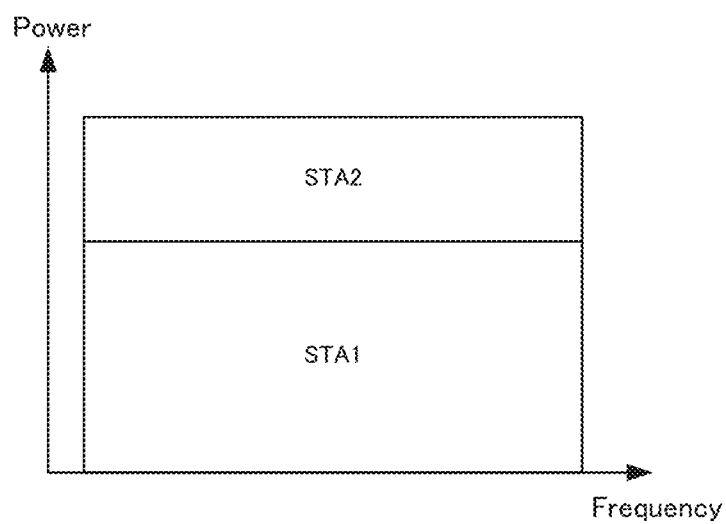
FIG. 4 illustrates exemplary multiplex power allocation in NOMA.

An example of NOMA is a method of non-orthogonal multiplexing by changing the power ratio (i.e., allocation power) of a multiplexed signal between STAs, as illustrated in FIG. 3. FIG. 4 illustrates exemplary multiplex power allocation in NOMA. An AP determines a group of users (e.g., STAs) to be non-orthogonally multiplexed and the multiplex power ratio for the group based on, for example, reception quality (e.g., channel state, reception Signal-to-interference plus Noise power Ratio (SINR), and average or instantaneous user throughput) of each STA.

Hereinafter, the group of users to be non-orthogonally multiplexed (i.e., a user group (or terminal group) to be a target of non-orthogonal multiplex transmission) is referred to as a "NOMAgroup". Additionally, STAs included in a NOMA group (e.g., STAs power-multiplexed by NOMA) are referred to as "NOMA users", and STAs not included in a NOMA group are referred to as 'non NOMA users'.

The AP may perform a brute force search for the multiplex power ratios for signals for the STAs, or may refer to a table in which the multiplex power ratios are specified. The multiplex power ratio may be a value (e.g., percentage) of the transmit power for each STA, or may be a percentage of the power for a reference signal of a PPDU including a NOMA signal. In general, higher power is allocated to the STA farther from the AP (e.g., STA 1 in FIG. 3), and lower power is allocated to the STA closer to the AP (e.g., STA 2 in FIG. 3).

The STA receives a NOMA signal, and extracts and decodes a desired signal from the NOMA signal based on the multiplex power ratio. The STA may perform reception processing on the NOMA signal based on Successive Interference Cancelation (SIC), for example. In the SIC, for example, the STA may extract the desired signal for the STA by generating a replica of a signal for another STA corresponding to a power ratio greater than the power ratio of the STA and subtracting the signal replica from the received NOMA signal, for example.

Further, studies have been carried out on, for example, a method in which a plurality of NOMA groups are spatially multiplexed on the same frequency resource (hereinafter, referred to as "MU-MIMO NOMA") (see, for example, NPL 2).

Figure 5:
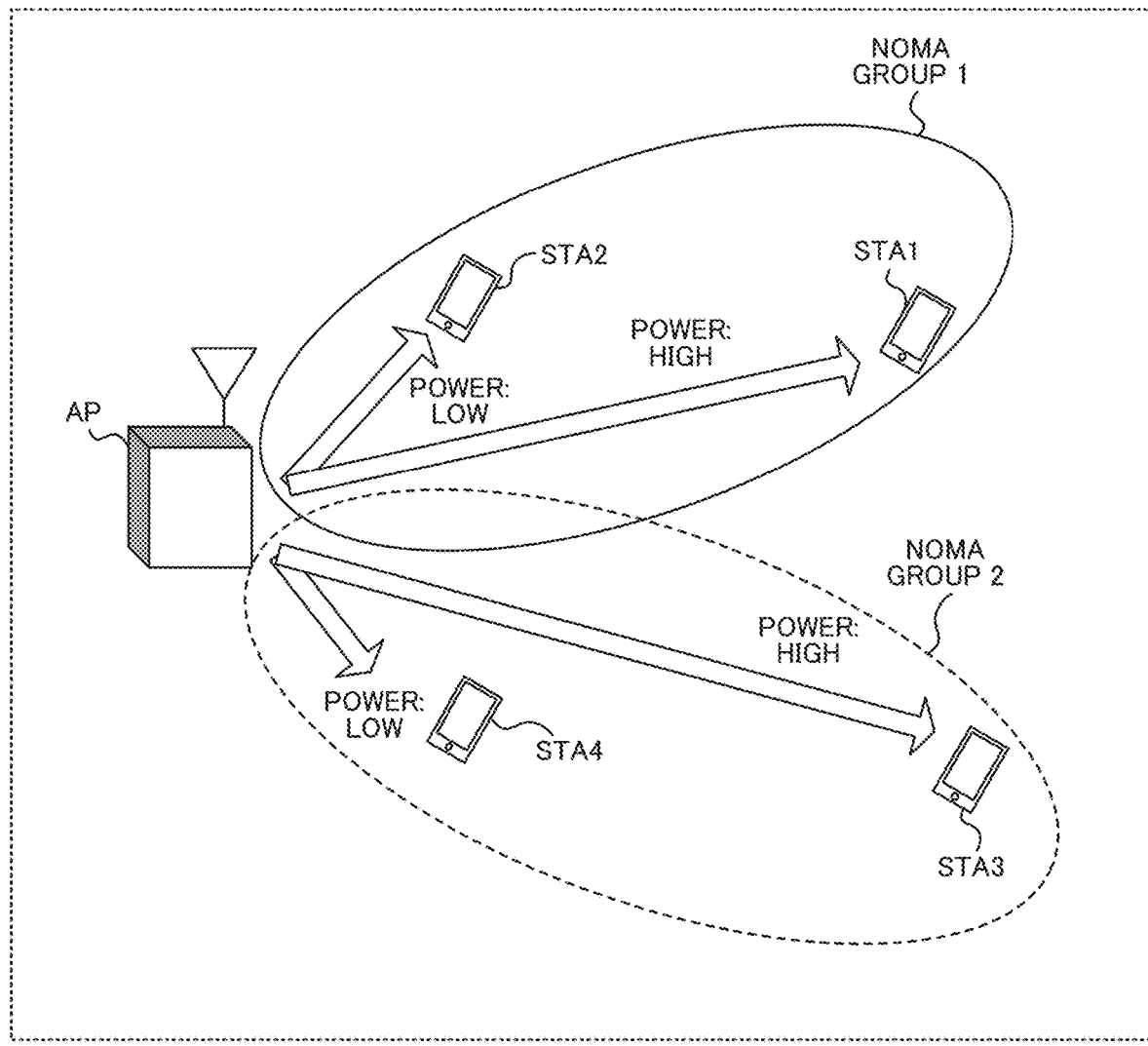
FIG. 5 illustrates an exemplary MU Multiple Input Multiple Output (MIMO) NOMA.

FIG. 5 illustrates an exemplary MU-MIMO NOMA.

In MU-MIMO NOMA, different beams (or precoding) are respectively used for the NOMA groups, for example. In addition, the multiplex power ratio between users to be multiplexed is determined in each NOMA group. The STAs receiving a MU-MIMO NOMA signal may eliminate inter-beam interference by, for example, Interference Rejection Combining (IRC).

Incidentally, the STA uses information (e.g., the number of spatial streams, MCS, coding method, multiplex power ratio, etc.) of another STA included in the same NOMA group for the extraction of a desired signal from the NOMA signal. In the 3rd Generation Partnership Project (3GPP), for example, control information addressed to a terminal is transmitted through a downlink control channel (e.g., Physical Downlink Control Channel (PDCCH)) in a radio frame other than the radio frame in which the NOMA signal is transmitted. In a wireless LAN, in contrast, the STA information is assumed to be included in the User field of SIG-B illustrated in FIG. 2, for example.

Studies have not been fully conducted, however, on a NOMA (e.g., including MU-MIMO NOMA) control method in a WLAN system such as 11be. Thus, an embodiment of the present disclosure will provide a description of a method of appropriately controlling NOMA processing in MU transmissions.

Embodiment 1

[Configuration of Radio Communication System]

A radio communication system according to an embodiment of the present disclosure includes at least one AP 100 and a plurality of STAs 200.

In DL communication (e.g., transmission and reception of DL data), for example, AP 100 (or also referred to as a "downlink radio transmission apparatus") performs DL MU transmissions of DL signals to the plurality of STAs 200 (or also referred to as a "downlink radio reception apparatus"). Each of STAs 200 receives a DL signal for the STA 200 from the signals that have been DL MU-transmitted.

Figure 6:
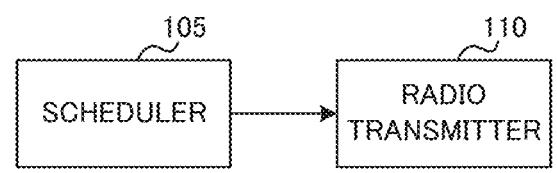
FIG. 6 is a block diagram illustrating an exemplary configuration of a part of an AP according to Embodiment 1.

FIG. 6 is a block diagram illustrating an exemplary configuration of a part of AP 100 according to an embodiment of the present disclosure. In AP 100 illustrated in FIG. 6, scheduler 105 (e.g., corresponding to control circuitry) generates information (e.g., NOMA control information to be described later) on a terminal group (e.g., NOMA users) to be a target of non-orthogonal multiplex transmission among a plurality of terminals (e.g., STAs 200). Radio transmitter 110 (e.g., corresponding to transmission circuitry) transmits the information on the terminal group during a period (e.g., PPDU header, or SIG-B field) for transmitting control information addressed to the plurality of terminals.

Figure 7:
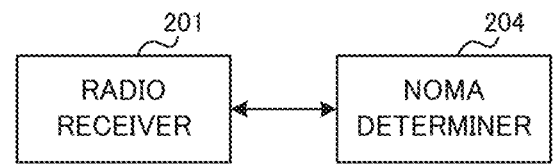
FIG. 7 is a block diagram illustrating an exemplary configuration of a part of an STA according to Embodiment 1.

FIG. 7 is a block diagram illustrating an exemplary configuration of a part of STA 200 according to an embodiment of the present disclosure. In STA 200 illustrated in FIG. 7, radio receiver 201 (e.g., corresponding to reception circuitry) receives information on a non-orthogonally multiplexed terminal group (e.g., NOMA group) during a period (e.g., PPDU header, or SIG-B field) for receiving downlink control information. NOMA determiner 204 (e.g., corresponding to control circuitry) controls reception of a downlink non-orthogonal multiplex signal (e.g., NOMA signal) based on the information on the terminal group.

<Exemplary Configuration of AP 100>

Figure 8:
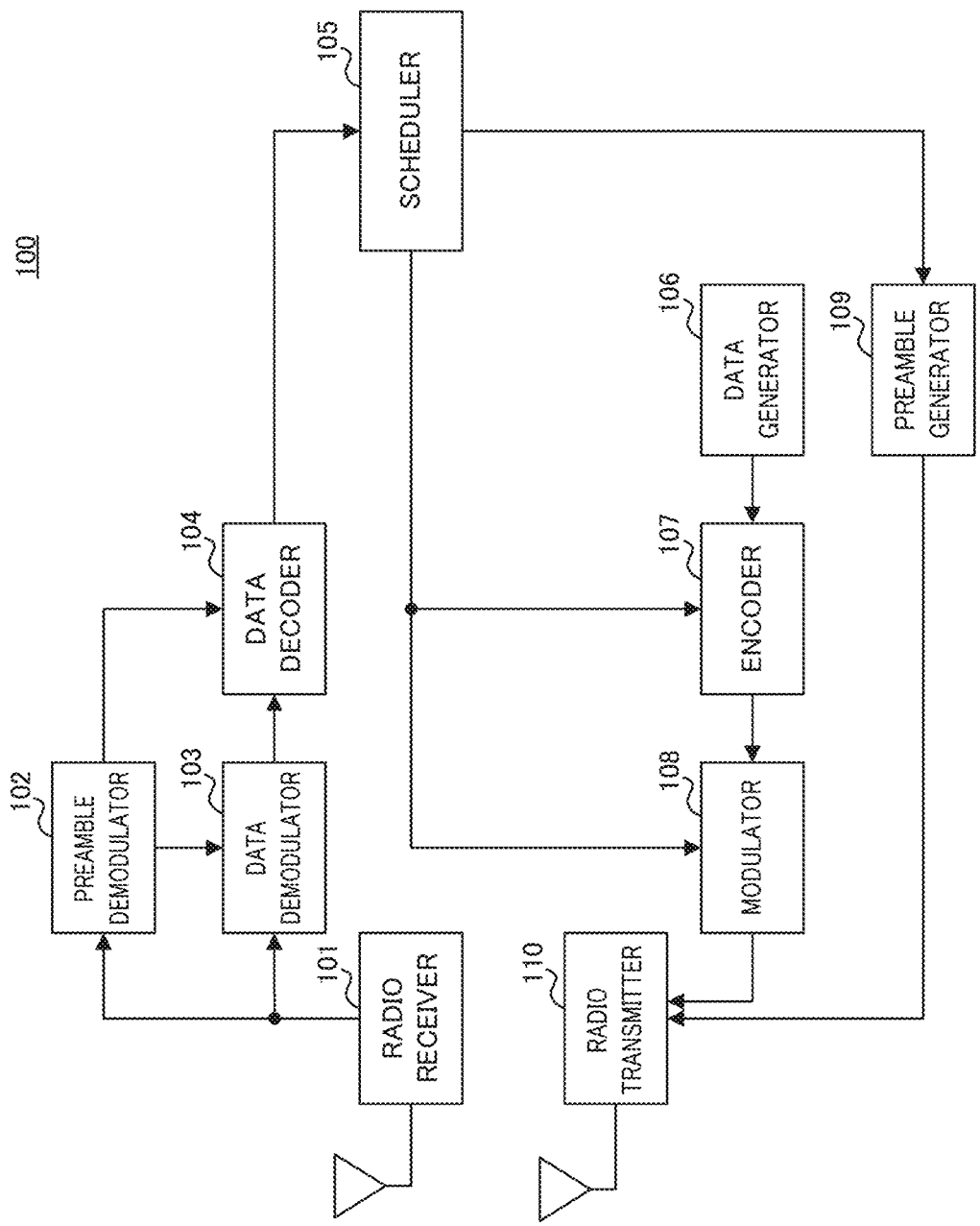
FIG. 8 is a block diagram illustrating an exemplary configuration the AP according to Embodiment 1.

FIG. 8 is a block diagram illustrating an exemplary configuration of AP 100. AP 100 illustrated in FIG. 8 includes, for example, radio receiver 101, preamble demodulator 102, data demodulator 103, data decoder 104, scheduler 105, data generator 106, encoder 107, modulator 108, preamble generator 109, and radio transmitter 110.

Radio receiver 101 receives a signal transmitted from STA 200 via an antenna, and performs radio reception processing such as down-conversion and A/D conversion on the received signal. For example, radio receiver 101 extracts a preamble section (also referred to as a preamble signal) from the received signal after the radio reception processing, and outputs the preamble section to preamble demodulator 102. Radio receiver 101 also extracts, for example, a data section (also referred to as a data signal) from the received signal after the radio reception processing, and outputs the data section to data demodulator 103.

Preamble demodulator 102 performs processing such as a Fourier transform (Fast Fourier Transform (FFT)) on the preamble section inputted from radio receiver 101, and extracts control information to be used for demodulating and decoding the data included in the preamble section. The control information may include, for example, radio allocation resource information (e.g., allocated frequency resource and frequency bandwidth), an MCS, or a coding method. Preamble demodulator 102 outputs the extracted control information to data demodulator 103 and data decoder 104. Preamble demodulator 102 may also output a channel estimation result to data demodulator 103, for example, when performing channel estimation using the preamble.

Data demodulator 103 performs processing such as FFT on the data section inputted from radio receiver 101, demodulates the data section based on the control information or the channel estimation result inputted from preamble demodulator 102, and outputs the demodulated data signal to data decoder 104.

Data decoder 104 decodes the data signal inputted from data demodulator 103 using the control information inputted from preamble demodulator 102, and acquires a signal of each STA 200. Data decoder 104 outputs the acquired signal to scheduler 105.

The data signal transmitted from STA 200 may include, for example, radio quality information of each STA 200. The radio quality information may be, for example, channel information, or may be a mean Signal-to-Noise Ratio (SNR) per frequency resource.

Scheduler 105 performs NOMA scheduling for STA 200, for example, based on the radio quality information of each STA 200 inputted from data decoder 104. For example, scheduler 105 may determine the number of STAs 200 included in a NOMA group (i.e., the number of transmission target terminals or the number of multiplexed users), an MCS, a coding method, an allocated frequency resource, and a frequency bandwidth for DL data.

Scheduler 105 also determines NOMA group allocation for STAs 200 or information, such as a multiplex power ratio, on the NOMA group to be included in SIG-B (hereinafter referred to as "NOMA control information").

Scheduler 105 outputs scheduling information indicating the scheduling result to encoder 107, modulator 108 and preamble generator 109.

Data generator 106 generates a data sequence (i.e., DL data) for STA 200, and outputs the generated data sequence to encoder 107. Note that data generator 106 need not generate a data sequence nor output the data sequence to encoder 107 when AP 100 transmits a Null Data Packet (NDP) to STA 200.

Encoder 107 encodes the data sequence inputted from data generator 106 based on the scheduling information (e.g., coding method or MCS) inputted from scheduler 105, and outputs the encoded data to modulator 108.

Modulator 108 modulates the encoded data inputted from encoder 107, for example, based on the scheduling information (e.g., frequency resource or MCS) inputted from scheduler 105, and outputs the modulated signal (i.e., data section) to radio transmitter 110. For example, modulator 108 may assign the modulated signal to the radio resource, perform Inverse Fast Fourier Transform (IFFT) processing, generate an OFDM signal, and output the signal to radio transmitter 110. In addition, modulator 108 may output, to radio transmitter 110, a multiplexed signal obtained by controlling the power for the modulated signal based on the scheduling information (e.g., multiplex power ratio).

Preamble generator 109 generates a preamble section, for example, based on the scheduling information (e.g., the number of transmission target terminals, coding method, MCS, allocated frequency resource, or multiplex power ratio) inputted from scheduler 105, and outputs the preamble section to radio transmitter 110. The preamble section may include, for example, the NOMA control information.

Radio transmitter 110 time-multiplexes the data section inputted from modulator 108 and the preamble section inputted from preamble generator 109. Radio transmitter 110 performs radio transmission processing, such as D/A conversion, and up-conversion for a carrier frequency, on the time-multiplexed signal, and transmits the signal after the radio transmission processing to STA 200 via the antenna.

<Exemplary Configuration of STA 200>

Figure 9:
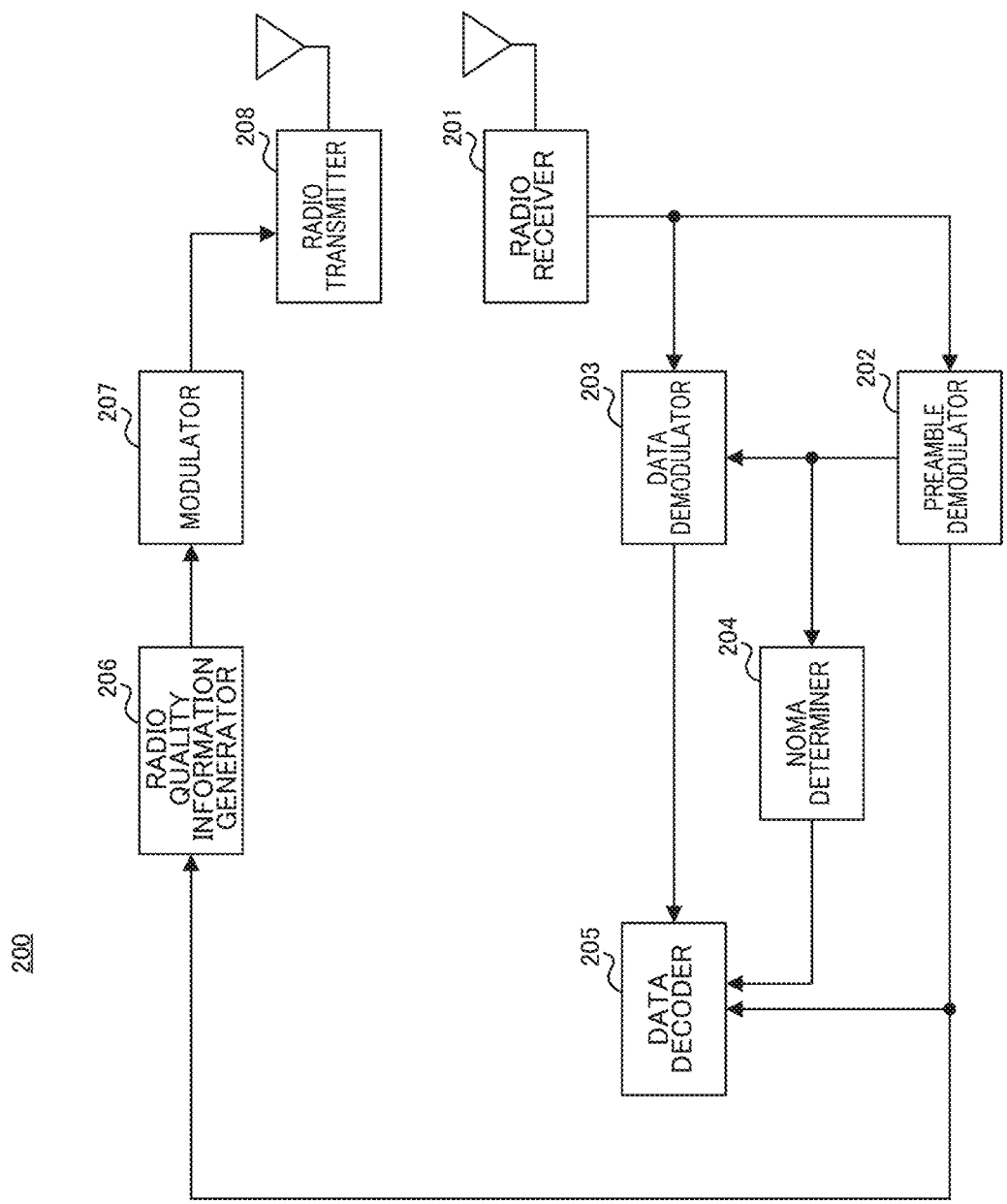
FIG. 9 is a block diagram illustrating an exemplary configuration of the STA according to Embodiment 1.

FIG. 9 is a block diagram illustrating an exemplary configuration of STA 200. STA 200 illustrated in FIG. 9 includes, for example, radio receiver 201, preamble demodulator 202, data demodulator 203, NOMA determiner 204, data decoder 205, radio quality information generator 206, modulator 207, and radio transmitter 208.

Radio receiver 201 performs radio reception processing such as down-conversion and A/D conversion on a signal received via an antenna. Radio receiver 201 extracts a preamble section from the signal after the radio reception processing, and outputs the preamble section to preamble demodulator 202. Radio receiver 201 also extracts a data section from the signal after the radio reception processing, and outputs the data section to data demodulator 203. Note that radio receiver 201 need not output a signal to data demodulator 203 when, for example, STA 200 has received a control frame indicating an NDP Announcement in advance and the received signal can be identified as an NDP.

Preamble demodulator 202 performs demodulation processing such as FFT on the preamble section inputted from radio receiver 201, and extracts control information to be used for demodulating and decoding the data section, for example, from the demodulated preamble section. The control information includes, for example, a frequency bandwidth, an allocated frequency resource, an MCS, a coding method, the number of spatial streams, and a multiplex power ratio. Preamble demodulator 202 outputs the extracted control information to data demodulator 203, NOMA determiner 204 and data decoder 205.

Preamble demodulator 202 may also output a channel estimation result to data demodulator 203, for example, when performing channel estimation based on a reference signal included in the preamble section. When the received signal is an NDP, Preamble demodulator 202 outputs the channel estimation result to radio quality information generator 206.

Data demodulator 203 performs processing such as FFT, channel equalization, or demodulation on the data section inputted from radio receiver 201, for example, based on the control information inputted from preamble demodulator 202 (e.g., frequency bandwidth or allocated frequency resources) and the channel estimation result, and extracts the demodulated data for STA 200. Data demodulator 203 outputs the extracted demodulated data to data decoder 205.

NOMA determiner 204 determines whether the demodulated data demodulated in data demodulator 203 is multiplexed by NOMA based on the control information inputted from preamble demodulator 202. In other words, NOMA determiner 204 determines whether STA 200 is a user subjected to non-orthogonal multiplexing by NOMA. NOMA determiner 204 outputs the NOMA determination result to data decoder 205.

Data decoder 205 extracts desired data from the demodulated data inputted from data demodulator 203 based on the NOMA determination result inputted from NOMA determiner 204 and the control information inputted from preamble demodulator 202, and decodes the desired data.

For example, data decoder 205 decodes the demodulated data based on the control information (e.g., multiplex power ratio, coding method, or MCS) when the NOMA determination result indicates that the signal is a NOMA signal (i.e., multiplexed by NOMA).

When STA 200 can perform SIC processing, for example, data decoder 205 may perform the SIC processing. For example, data decoder 205 compares allocation power based on STA information portions (e.g., multiplex power ratios) for other users included in the same NOMA group as STA 200. When there is a user (another STA) with allocation power higher than that of STA 200, for example, data decoder 205 demodulates and decodes a signal for another STA, and performs error determination such as Cyclic Redundancy Check (CRC), based on the STA information portion (e.g., multiplex power ratio, coding method, MCS, or frequency resource) for another STA. When the error determination result indicates no error, data decoder 205 generates a signal replica based on the STA information portion (e.g., multiplex power ratio, coding method. MCS, or frequency resource) for another STA by multiplying, by a channel estimate, a signal obtained by encoding and modulating the decoded signal. Data decoder 205 extracts and decodes a signal for STA 200 by subtracting the generated signal replica from the data section. Note that a domain where the signal replica is subtracted from the data section may be the time domain or the frequency domain. When there are a plurality of users with allocation power higher than that of STA 200, data decoder 205 may extract the signal for STA 200 by generating a signal replica and subtracting the signal replica from the demodulated data in order from an STA with highest allocation power by the SIC processing.

Further, when the NOMA determination result does not indicate that the signal is a NOMA signal (i.e., multiplexed by NOMA signal), for example, data decoder 205 decodes the demodulated data based on the control information (e.g., coding method or MCS).

Radio quality information generator 206 generates radio quality information indicating at least one of the channel estimation result inputted from preamble demodulator 202 and radio quality (e.g., mean SNR) measured for each frequency resource, and outputs the information to modulator 207.

Modulator 207 performs processing such as IFFT processing or modulation on the signal inputted from radio quality information generator 206, and generates a modulated signal (e.g. referred to as a data signal or an OFDM signal). In addition, modulator 207 generates a radio frame (i.e., packet signal), which is the data signal with a preamble section added, and outputs the radio frame to radio transmitter 208.

Radio transmitter 208 performs radio transmission processing, such as D/A conversion, and up-conversion for a carrier frequency, on the radio frame inputted from modulator 207, and transmits the signal after the radio transmission processing to AP 100 via the antenna.

[Exemplary Operations of AP and STA]

Next, exemplary operations of AP 100 and STA 200 according to the present embodiment will be described.

For example, AP 100 transmits information identifying a NOMA group (e.g., NOMA control information) in a single PPDU header including STA information portions for a plurality of STAs 200 multiplexed by MU-MIMO or OFDMA. The NOMA control information may include, for example, information indicating whether the corresponding STA 200 is a NOMA user included in a NOMA group, and information indicating the NOMA group.

By way of example, a description will be given below of a method of transmitting the NOMA control information in the format of control information for MU transmissions in 11ax (e.g., SIG-B in the case of DL MU transmissions).

Figure 10:
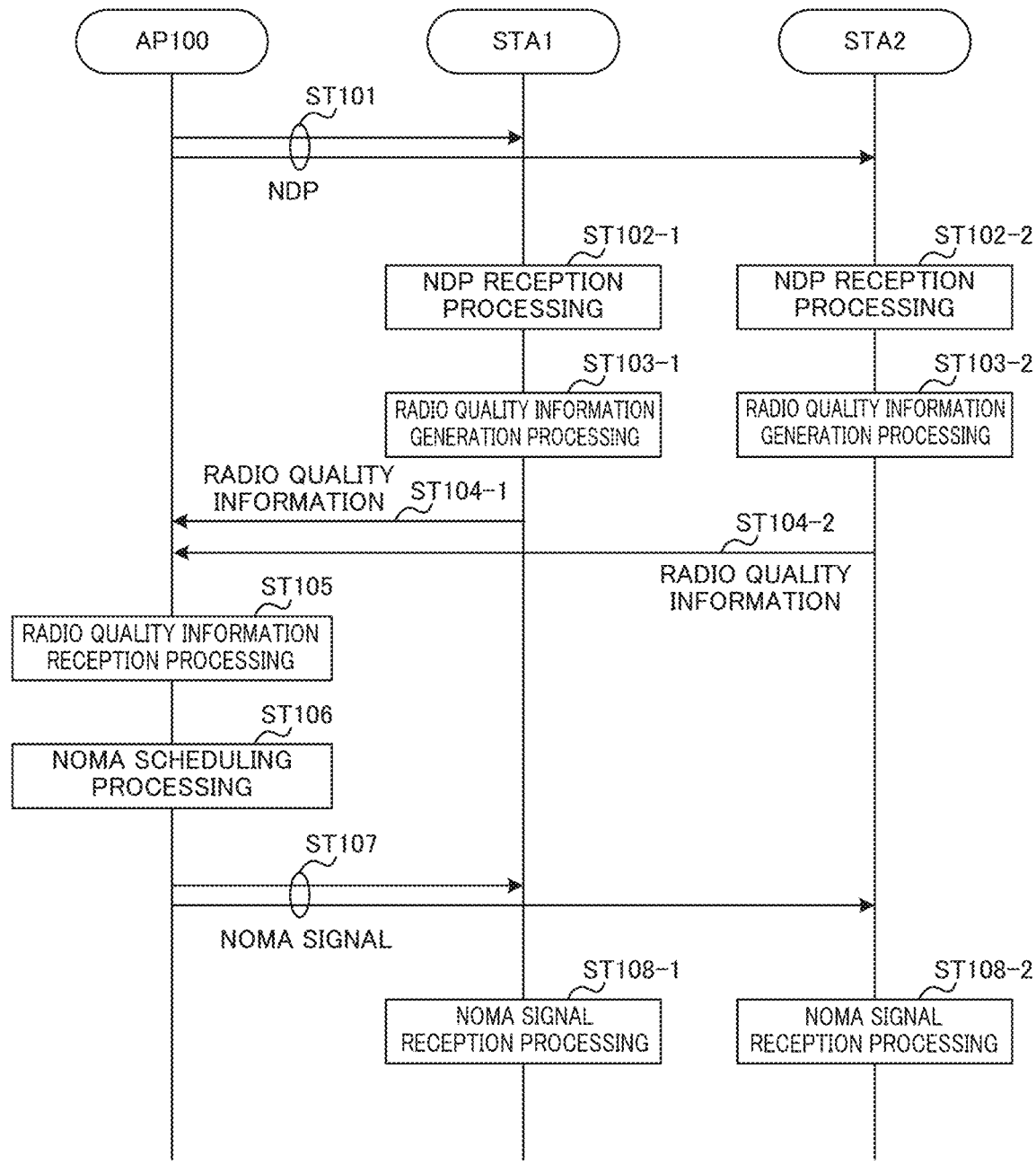
FIG. 10 is a sequence diagram describing an exemplary operation of a radio communication system according to Embodiment 1.

FIG. 10 is a sequence diagram describing an exemplary operation of a radio communication system.

FIG. 10 illustrates an exemplary operation of MU transmissions including a NOMA signal in AP 100 and two STAs 200 (e.g., STA 1 and STA 2), by way of example. Note that the number of users to be spatially multiplexed or frequency-multiplexed is not limited to two in the MU transmissions, and may be three or more. Further, the number of users to be power-multiplexed by NOMA is not limited to two in the MU transmissions, and may be three or more.

In FIG. 10, AP 100 transmits an NDP by DL MU transmissions (e.g., MU-MIMO or OFDMA) to STA 1 and STA 2, for example (ST101). STA 1 and STA 2 perform reception processing on the NDP transmitted from AP 100 (ST102-1 and ST102-2).

STA 1 and STA 2 each generate radio quality information including a channel estimation result and a mean SNR measured for each frequency resource, for example, based on a reference signal (e.g., Long Training Field (LTF)) included in a preamble section of the NDP (ST103-1 and ST103-2). STA 1 and STA 2 each perform uplink (UL) transmission of the radio quality information to AP 100 (ST104-1 and ST104-2).

AP 100 receives the UL signals transmitted from STA 1 and STA 2, and acquires the radio quality information included in the UL signals (ST105).

AP 100 performs scheduling processing for each STA based on, for example, a received SINR, average/instantaneous user throughput, pathloss, or SIC computational complexity, in addition to the radio quality information of each STA (ST106). For example, AP 100 may determine the combination of STAs included in a NOMA group and the multiplex power ratio for the STAs in the NOMA group. AP 100 may also determine the MCS and coding method corresponding to the multiplex power ratio for each STA.

AP 100 transmits a DL MU signal including a NOMA signal to STA 1 and STA 2, for example, based on the NOMA control information (e.g., scheduling information on NOMA) to be included in control information (e.g., SIG-B) (ST107).

Figure 11:
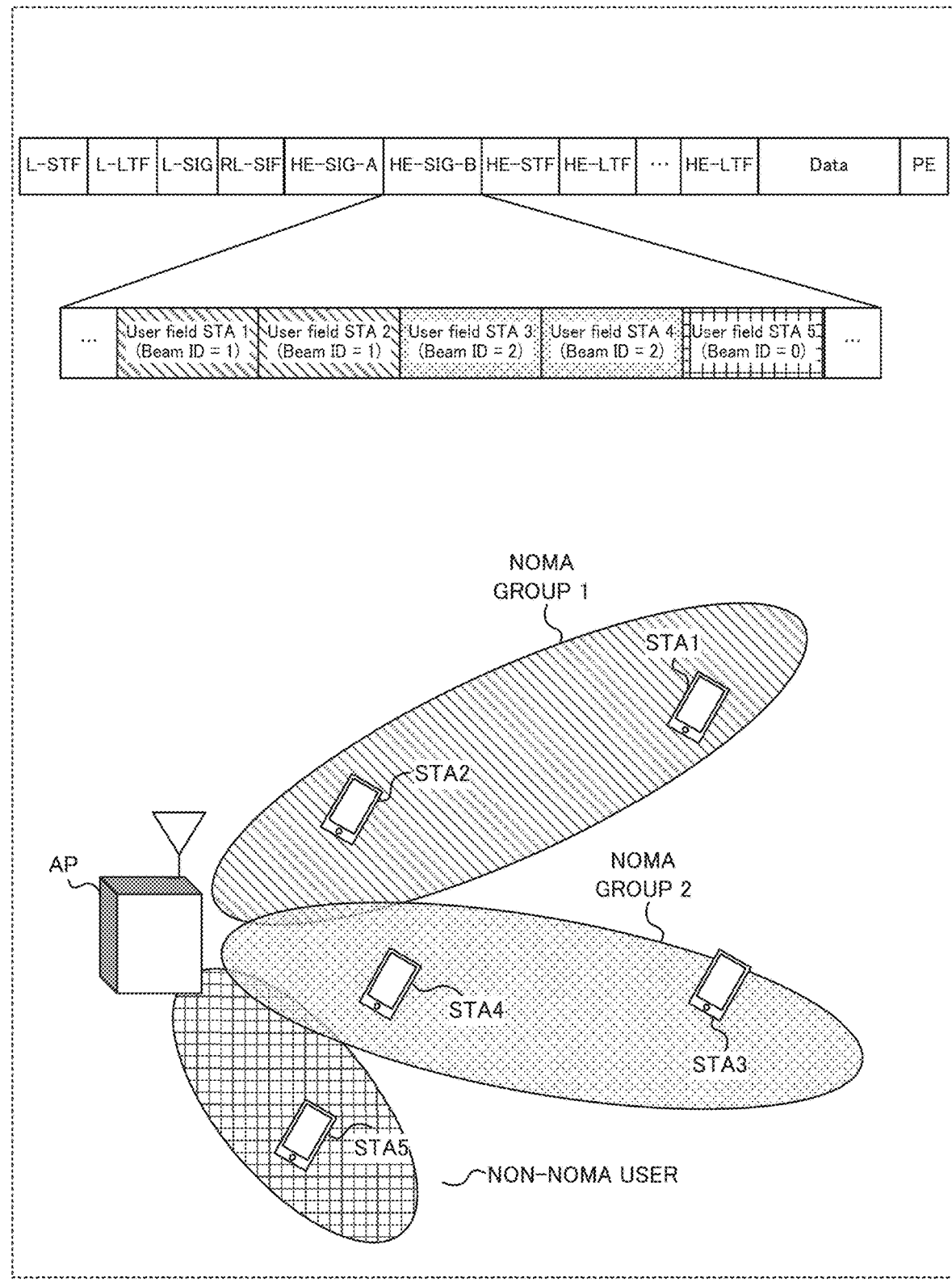
FIG. 11 illustrates examples of a DL MU PPDU format and MU MIMO NOMA according to Embodiment L.

FIG. 11 illustrates examples of a DL MU signal format and MU MIMO NOMA.

By way of example, FIG. 11 illustrates a case where STAs multiplexed in a DL MU signal include STA 3 to STA 5 in addition to STA 1 and STA 2. In the example illustrated in FIG. 11. STA 1 and STA 2 are NOMA users included in NOMA group 1, and STA 3 and STA 4 are NOMA users included in NOMA group 2. Further, STA 5 is a non NOMA user not included in a NOMA group in the example illustrated in FIG. 11.

In this case, SIB-B (e.g., User field) of a preamble section (e.g., PPDU header) in the DL MU signal includes STA information portions for the multiplexed STA 1 to STA 5, as illustrated in FIG. 11.

SIG-B illustrated in FIG. 11 may also include information identifying the NOMA groups respectively including the STAs. The information identifying the NOMA group may be, for example, a Beam ID corresponding to a beam (or precoding) to be applied to each NOMA group. The Beam ID may be included in the User field, for example.

In the example illustrated in FIG. 11, "Beam ID=0" indicates a non NOMA user, and "Beam ID≠0" indicates a NOMA user. In addition, different values are respectively configured for the NOMA groups as the Beam ID for "Beam ID≠0" in the example illustrated in FIG. 11. In other words, the Beam ID (NOMA control information) is information indicating whether each of the plurality of multiplexed STAs 200 is a NOMA user (i.e., transmission target by NOMA).

In FIG. 11, "Beam ID=1" is configured for STA 1 and STA 2 included in NOMA group 1, and "Beam ID=2" is configured for STA 3 and STA 4 included in NOMA group 2, for example. In addition, "Beam ID=0" is configured for STA 5 that is a non NOMA user not included in any of the NOMA groups.

As described above, AP 100 transmits the information (e.g., Beam ID) identifying STAs 200 multiplexed by NOMA among a plurality of STAs 200, for example, in the preamble section (e.g., PPDU header) including the STA information portions for the plurality of users (STAs) multiplexed by MU-MIMO or OFDMA.

In FIG. 10, STA 1 and STA 2 perform reception processing on the DL MU signal (e.g., NOMA signal) (ST108-1 and ST108-2). For example, STA 1 and STA 2 identify the STA information portions for respective STAs based on SIG-B included in the DL MU signal.

In addition, STA 1 and STA 2 identify the NOMA group including each STA based on the NOMA control information (e.g., Beam ID) included in the STA information portion, for example. In the example illustrated in FIG. 11, "Beam ID=1" is configured in the STA information portion corresponding to each of STA 1 and STA 2, for example, and thus each STA determines that STA 1 and STA 2 are included in NOMA group 1.

Further, STA 1 and STA 2 may respectively extract the signals addressed to STA 1 and STA 2 from the data section of the received signal and decode the signals, for example, based on the information on the multiplex power ratio (not illustrated in FIG. 11) included in the STA information portions. When STA 20 is capable of performing SIC processing, for example, STA 200 may extract and decode a signal for STA 200 by generating a signal replica of a signal for another STA for which a Beam ID common to STA 200 is configured and to which power higher than allocation power of STA 200 is allocated in the STA information portion, and subtracting the signal replica from the data section.

As described above, in the present embodiment, AP 100 generates NOMA control information on a NOMA group to be a target of transmission by NOMA among a plurality of STAs 200 multiplexed by MU-MIMO or OFDMA, and transmits the NOMA control information during a period (e.g., SIG-B field) for transmitting control information for the plurality of STAs 200, for example. In addition, STA 200 receives the NOMA control information on the NOMA group multiplexed by NOMA during a period (e.g., SIG-B field) for receiving downlink control information, and controls reception of a downlink NOMA signal based on the NOMA control information, for example.

This allows STA 200 to identify control contents on NOMA (e.g., whether NOMA is applied, NOMA group, or the number of NOMA users) for STA 200 based on the control information (e.g., SIG-B) for a plurality of STAs included in a DL MU signal. Thus, the present embodiment enables STA 200 to appropriately control NOMA processing for STA 200 based on a plurality of STA information portions included in SIG-B, for example.

Embodiment 2

In the present embodiment, a description will be given of methods of transmitting (i.e., indicating) NOMA control information during a period (e.g., Common field) for transmitting common information for a plurality of STAs within a period (e.g., PPDU header or SIG-B field) for transmitting control information for the STAs, for example.

Note that a base station and a terminal according to the present embodiment have basic configurations common to AP 100 and STA 200 according to Embodiment 1, and thus FIGS. 8 and 9 will be used for the description.

For example, in the present embodiment, AP 100 indicates, to STA 200, the NOMA control information (e.g., presence or absence of NOMA group or the number of NOMA users) identifying a NOMA group assigned to a frequency resource (RU) by frequency resource allocation information (e.g., RU Allocation subfield) included in the common information.

Note that a multiplex power ratio between NOMA users in a NOMA group may be included in, for example, STA information for each user (i.e., STA) in the present embodiment.

For example, AP 100 indicates, to STA 200, the frequency resource (e.g., RU) including a NOMA group using the common information (e.g., Common field). AP 100, for example, may include the NOMA control information in the frequency resource allocation information (e.g., RU Allocation subfield) included in the common information. The NOMA control information, for example, referred to as a "NOMA bit" may be added, and it indicates whether a NOMA group is assigned to the frequency resource (e.g., RU where spatial multiplexing can be performed) indicated in the frequency resource allocation information in the common information, for example.

FIG. 12 illustrates exemplary frequency resource allocation information (e.g., RU Allocation subfield) including the NOMA bit. By way of example, FIG. 12 illustrates association of 8-bit RU allocation bit sequences with allocation patterns of nine RUs (e.g., RU #1 to RU #9) and association of 2-bit NOMA bits with the presence or absence of a NOMA group. Note that the number of NOMA bits is not limited to 2 bits, and may be 1 bit or 3 bits or more.

By way of example, FIG. 12 illustrates an example of adding the NOMA bit for the 106-tone or higher RUs (e.g., 106-tone, 242-tone, 484-tone, and 996-tone RUs in FIG. 12) where the spatial multiplexing is possible in 11ax. Note that the RUs where the spatial multiplexing is possible are not limited to the 106-tone or higher RUs illustrated in FIG. 12.

Ina case of including a single RU where the spatial multiplexing is possible in FIG. 12, the NOMA bit indicates the presence or absence of a NOMA group in the corresponding RU. In FIG. 12, for example, cases of the RU allocation bit sequences "00010$y_2y_1y_0$" to "11011$y_2y_1y_0$" with "NOMA bit=0" indicate that no NOMA group is included in the single RU where the spatial multiplexing is possible. Additionally, in FIG. 12, cases of the RU allocation bit sequences "00010$y_2y_1y_0$" to "11011$y_2y_1y_0$" with "NOMA bit=1" indicate that a NOMA group is included in the single RU where the spatial multiplexing is possible.

Further, in a case of including two RUs where the spatial multiplexing is possible in FIG. 12, the NOMA bit indicates the presence or absence of a NOMA group for each combination of RUs. In FIG. 12, for example, a case of either of the RU allocation bit sequences "0110$y_1y_0y_1y_0$" or "10$y_2y_1y_0y_2y_1y_0$" with "NOMA bit=0" indicates that no NOMA group is included in both of the two RUs (e.g., RU #1 to RU #4 and RU #6 to RU #9). In addition, "NOMA bit=1" indicates that the right RU (e.g., RU #6 to RU #9) includes a NOMA group, "NOMA bit=2" indicates that the left RU (e.g., RU #1 to RU #4) includes a NOMA group, and "NOMA bit=3" indicates that both of the two RUs (e.g., RU #1 to RU #4 and RU #6 to RU #9) respectively include NOMA groups, for example.

For example, AP 100 can variably configure a parameter included in the STA information based on the frequency resource allocation information and the NOMA bit included in the common information. For example, AP 100 need not include information on a multiplex power ratio in the STA information for STA 200 assigned to the RU including no NOMA group. In other words, AP 100 may include the information on a multiplex power ratio in the STA information for STA 200 assigned to the RU including a NOMA group, for example.

As described above, the present embodiment allows AP 100 to determine whether to include the information on a NOMA group in the STA information (i.e., User field) based on the common information. This reduces the signaling amount of the STA information.

Next, Methods 2-1 and 2-2 will be each described as examples of the NOMA control information indication method according to the present embodiment.

<Method 2-1>

In Method 2-1, AP 100 indicates, to each STA 200, information indicating the number of NOMA users common to NOMA groups (e.g., NOMA control information) in the frequency resource allocation information (e.g., RU Allocation subfield) in the common information (e.g., Common field).

In Method 2-1, the NOMA control information (e.g., NOMA bit) may be added, and it indicates, for example, information indicating whether a NOMA group is assigned to an RU in which the spatial multiplexing is possible and which is indicated in the frequency resource allocation information included in the common information, and the NOMA bit also indicates the number of NOMA users included in a NOMA group. Note that the number of NOMA users in a NOMA group may indicate the number of NOMA users common to a plurality of NOMA groups, for example.

FIG. 13 illustrates exemplary frequency resource allocation information (e.g., RU Allocation subfield) including the NOMA bit according to Method 2-1. By way of example, FIG. 13 illustrates association of 8-bit RU allocation bit sequences with allocation patterns of nine RUs (e.g., RU #1 to RU #9) and association of 2-bit NOMA bits with the presence or absence of a NOMA group and the number of NOMA groups. Note that the number of NOMA bits is not limited to 2 bits, and may be 1 bit or 3 bits or more.

By way of example, FIG. 13 illustrates an example of adding the NOMA bit for 106-tone or higher RUs where the spatial multiplexing is possible in 11ax. Note that the RUs where the spatial multiplexing is possible are not limited to the 106-tone or higher RUs illustrated in FIG. 13.

In FIG. 13, when the same number of NOMA users is included in each NOMA group multiplexed on the same RU (e.g., in a case where the number of NOMA users=2), AP 100 indicates the number of NOMA users common to the NOMA groups in the RU in which the spatial multiplexing is possible and which is indicated in the frequency resource allocation information in the common information. Note that the number of NOMA users common to the NOMA groups is not limited to two, and may be three or more. In other words, the presence or absence of a NOMA group and the number of NOMA users common to the NOMA groups are indicated to STA 200 by the NOMA bit.

Further, in Method 2-1, AP 100 arranges the STA information portions for STAs included in SIG-B, for example, in order of the multiplex power ratio for each NOMA group. For example, AP 100 maps the STA information portions for NOMA users in the User Specific field of SIG-B, in order (e.g., either ascending or descending order) of allocation power (e.g., multiplex power ratio) in NOMA.

Figure 14:
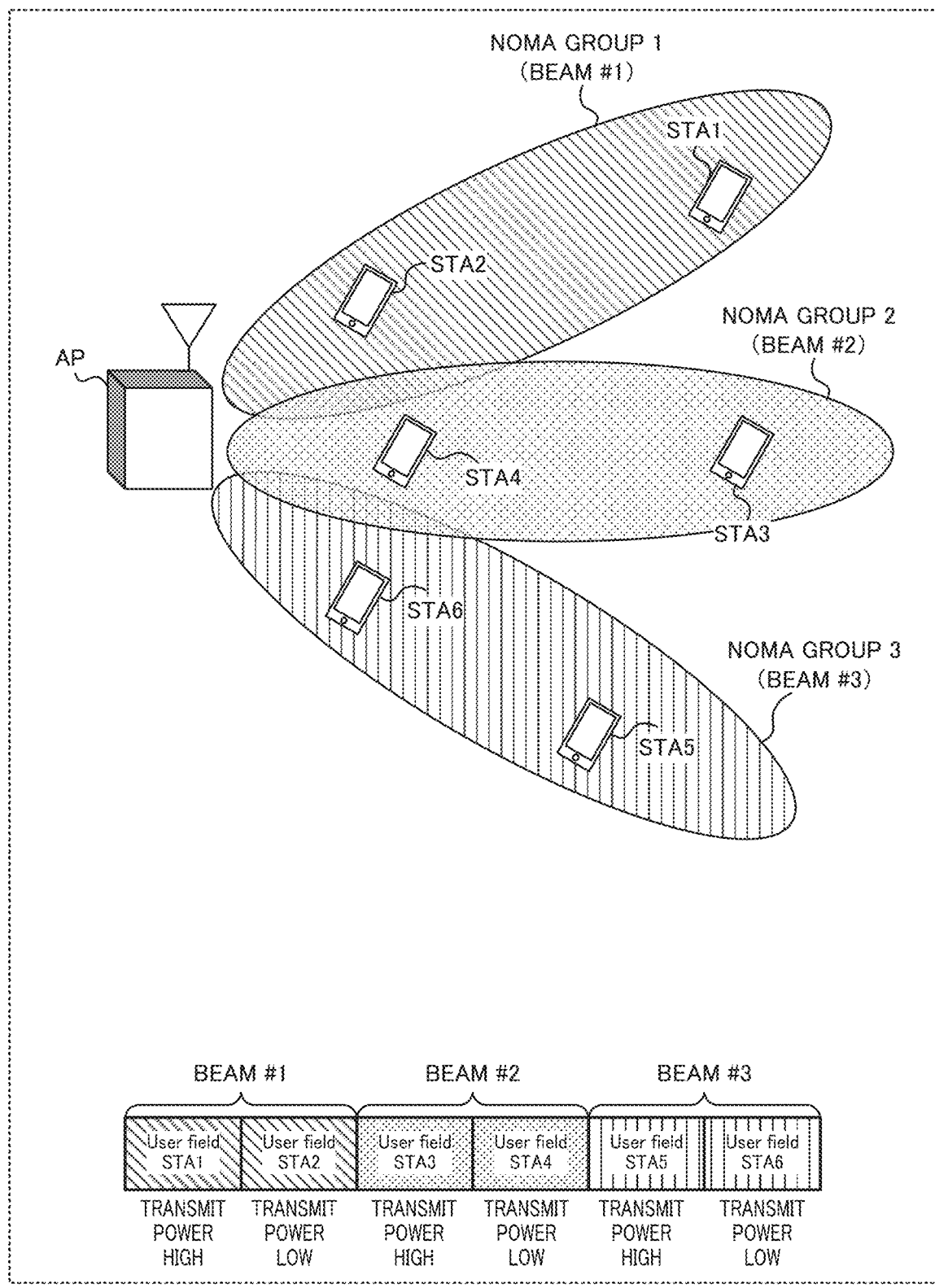
FIG. 14 illustrates examples of MU MIMO NOMA and STA information portions in SIG-B according to Method 2-1 in Embodiment 2.

FIG. 14 illustrates examples of MU-MIMO NOMA and STA information portions in the User Specific field in the case where the number of NOMA groups common to the NOMA groups is 2. In FIG. 14, AP 100 transmits a DL MU signal by MU-MIMO NOMA to NOMA group 1 including STA 1 and STA 2, NOMA group 2 including STA 3 and STA 4, and NOMA group 3 including STA 5 and STA 6.

At this time, the NOMA bit indicates that the number of NOMA users common to the NOMA groups=2, for example.

In addition, as illustrated in FIG. 14, AP 100 maps (arranges) the STA information portions for each NOMA group (i.e., for each beam) in descending order of the allocated transmit power in the User Specific field of SIG-B included in the DL MU signal. For example, the STA information portions are mapped in order of STA 1, which has higher transmit power, and STA 2 for NOMA group #1 (beam #1) in FIG. 14. Likewise, the STA information portions are mapped in order of STA 3, which has higher transmit power, and STA 4 for NOMA group #2 (beam #2), and the STA information portions are mapped in order of STA 5, which has higher transmit power, and STA 6 for NOMA group #3 (beam #3) in FIG. 14, for example.

As described above, AP 100 transmits the STA information portions in the order according to the allocation power in NOMA during a period (e.g., User Specific field) for transmitting information portions specific to STAs 200 in a NOMA group (e.g., STA information portions) within a period (e.g., PPDU header or SIG-B field) for transmitting control information for a plurality of STAs 200.

After receiving a DL MU signal, STAs 200 each identify the RU allocated to the STA 200, the presence or absence of a NOMA group in the allocated RU, and the number of NOMA users common to NOMA groups, for example, based on the frequency resource allocation information (e.g., RU Allocation subfield) in the common information, and acquire the STA information portion for each STA 200 based on the user information (e.g., User Specific field). STAs 200 also each identify which NOMA group the STA 200 is included in, which STA is in the same NOMA group, and the magnitude relation of the transmit power in the same NOMA group, based on the arrangement order of the STA information portions for STAs 200 and the number of NOMA users common to the NOMA groups.

In the case of FIG. 14 (e.g., in the case of the number of NOMA users common to NOMA groups=2), for example, STA 4 determines that the number of NOMA users in a NOMA group is 2 based on the common information in the received DL MU signal. Further, the STA information portion for STA 4 is mapped fourth according to the user information in the received DL MU signal, and STA 4 thus determines that STA 4 is included in NOMA group 2 (beam #3), which is the same as STA 3, and that the allocation power of STA 4 is lower than the allocation power of STA 3. STAs 200 other than STA 4 illustrated in FIG. 14 (e.g., STA 1 to STA 3, STA 5, and STA 6) determine the NOMA group and the magnitude relation of the transmit power in the NOMA group in the same manner.

As described above, Method 2-1 allows STA 200 to determine the combination of STAs 200 included in each NOMA group based on the NOMA bit included in the common information and the arrangement order of STA information portions included in the user information. Thus, information identifying the NOMA group, e.g., signaling on the beam (Beam ID), can be eliminated in the STA information portions.

Method 2-1 also allows STA 200 to determine the position of STA 200 in the order of power offset values in the NOMA group based on the arrangement order of the STA information portions. This enables STA 200 to identify, for example, the magnitude relation of allocation power (i.e., power offset values) between STA 200 and other STAs in the multiplex power ratio in the NOMA group. Thus, Method 2-1 makes it possible to eliminate signaling on the magnitude relation of allocation power (e.g., "Tx Power Offset ID" illustrated in FIG. 16 to be described later) among STAs 200 in the multiplex power ratio in the NOMA group.

Note that FIG. 14 illustrates the case where the STA information portions are arranged in order from the highest allocation power (e.g., transmit power)(i.e., in descending order), but the present disclosure is not limited to this, and the STA information portions may be arranged in order from the lowest allocation power (i.e., in ascending order), for example.

<Method 2-2>

In Method 2-2, NOMA control information indicated in the frequency resource allocation information (e.g., RU Allocation subfield) in the common information (e.g., Common field) is limited to a case where the number of spatial multiplexes (i.e., the number of MU multiplexes) by AP 100 is maximized.

FIG. 15 illustrates exemplary frequency resource allocation information according to Method 2-2. By way of example, FIG. 15 illustrates association of 8-bit RU allocation bit sequences with allocation patterns of nine RUs (e.g., RU #1 to RU #9) and the number of NOMA users.

By way of example, FIG. 15 illustrates that NOMA is enabled when the number of spatial multiplexes is the maximum eight among the 106-tone or higher RUs (e.g., RU #6 to RU #9) where the spatial multiplexing is possible in 11ax. For example, AP 100 may indicate the number of NOMA users in the RU without the NOMA bit.

When the 8-bit RU allocation bit sequence illustrated in FIG. 15 is "00010000" to "00010111", for example, STA 200 is indicated that NOMA is not used, that is, the number of NOMA users=0.

Meanwhile, when the 8-bit RU allocation bit sequence illustrated in FIG. 15 is "00011000", that is, when the number of spatial multiplexes (i.e., the number of MU multiplexes) is eight, STA 200 is indicated that NOMA is available and the number of NOMA users=2, for example.

As described above. NOMA is not used when the number of spatial multiplexes is seven or less in the example illustrated in FIG. 15. In other words, the NOMA control information indicating the number of NOMA users=2 is associated with some of the frequency resource candidate values ("0001100" in FIG. 15) among a plurality of frequency resource candidates (i.e., allocation patterns) in the frequency resource allocation information. Thus, the allocation pattern indicating the number of NOMA users is not required in the frequency resource allocation information (allocation pattern) indicating that the number of spatial multiplexes is seven or less, in FIG. 15.

As described above, Method 2-2 limits the frequency resource allocation pattern associated with the NOMA control information to some of the frequency resource allocation patterns in the frequency resource allocation information (e.g., RU Allocation subfield) included in the common information. This reduces signaling on the frequency resource allocation information.

Note that the Reserved bit of the RU Allocation subfield may be used to indicate information on NOMA when NOMA is available in the limited frequency resource allocation patterns.

Although FIG. 15 illustrates the case where the NOMA control information is indicated when the number of spatial multiplexes is maximized, the present disclosure is not limited to this. For example, the NOMA control information may be indicated in configuring some of a plurality of configurable numbers of spatial multiplexes. Some of the numbers of spatial multiplexes just mentioned may be, for example, different from the maximum number of spatial multiplexes. In addition, some of the numbers of spatial multiplexes in which the NOMA control information is indicated is not limited to 1 type, and may be 2 or more types.

Embodiment 3

In the present embodiment, a description will be given of methods of transmitting (i.e., indicating) NOMA control information (e.g., the number of NOMA users and multiplex power ratio) during a period (e.g., User Specific field) for transmitting specific information (e.g., STA information) for STAs in a NOMA group within a period (e.g., PPDU header or SIG-B field) for transmitting control information for a plurality of STAs, for example.

A base station and a terminal according to the present embodiment have basic configurations common to AP 100 and STA 200 according to Embodiment 1, and thus FIGS. 8 and 9 will be used for the description.

Methods 3-1 and 3-2 will be each described as examples of a NOMA control information indication method.

<Method 3-1>

FIG. 16 illustrates an exemplary format of user information (User field) in SIG-B for DL MU transmissions according to Method 3-1.

The user information illustrated in FIG. 16 includes, for example, NOMA control information (e.g., Beam ID, Tx Power Table, and Tx Power Offset ID illustrated in FIG. 16) for determining a multiplex power ratio, from a specified table.

The "Beam ID" illustrated in FIG. 16 is, for example, information indicating whether STA 200 is included in a NOMA group corresponding to the Beam ID. For example, "Beam ID=0" indicates that STA 200 is a non NOMA user not included in a NOMA group. "Beam ID≠0" indicates that STA 200 is a NOMA user included in a NOMA group.

Note that different Beam ID values may be respectively configured for different NOMA groups when there are a plurality of NOMA groups. In other words, a group including STAs 200 using the same beam (Beam ID) may be regarded as a single NOMA group. Note that a NOMA group may be composed of STAs 200 for which the same beam and the same RU are configured. In addition, the number of NOMA users included in a NOMA group is not limited to two, and may be three or more.

The "Tx Power Table" illustrated in FIG. 16 is, for example, information indicating a type in a table related to the multiplex power ratio. Additionally, the "Tx Power Offset ID" illustrated in FIG. 16 is, for example, information indicating an identifier of power offset values (hereinafter, referred to as "a") for STAs included in the Tx Power Table.

FIG. 17 illustrates an exemplary Tx Power Table.

In FIG. 17, the Tx Power Table indicates combinations of power offset values $\alpha_i$ (i is a value of Tx Power Offset ID) for each number of NOMA users (2 and 3 in FIG. 17). Note that the number of NOMA users in a NOMA group is not limited to two or three, and four or more NOMA users may be included.

After determining STAs 200 (i.e., the number of STAs) to be included in a NOMA group, AP 100, for example, selects a combination of the power offset values (i.e., multiplex power ratio) from the table illustrated in FIG. 17, and transmits a DL MU signal including a NOMA signal to STAs 200. At this time, the STA information portions included in the DL MU signal may include, for example, the "Beam ID" indicating the NOMA group, the "Tx Power Table" indicating the combination of power offset values, and the "Tx Power Offset ID" indicating the power offset values in the Tx Power Table, as illustrated in FIG. 16.

After receiving the DL MU signal including the STA information portions (see, for example, FIG. 16), STA 200, for example, identifies other STAs included in the same NOMA group as STA 200 and the number of NOMA users based on the Beam ID included in the STA information portions. STA 200 also identifies the power offset value for each STA 200 based on, for example, the Tx Power Tables and the Tx Power Offset IDs included in the STA information portions.

In FIG. 17, in a case where the number of NOMA users is "3", the Tx Power Table indicates "01", and the Tx Power Offset ID indicates "2", for example, STA 200 configures the power offset value for STA 200 to "$\alpha_2$=0.20". The same applies to other cases.

For example, STA 200 extracts and decodes a desired signal based on the identified NOMA group, the number of NOMA users in the NOMA group, and the power offset values configured for the respective STAs in the NOMA group.

As described above, Method 3-1 allows STA 200 to identify, for example, the NOMA group including STA 200, the number of NOMA users in the NOMA group, and the multiplex power ratio (e.g., power offset values) based on the NOMA control information included in the STA information portions. Thus, Method 3-1 enables STA 200 to appropriately control NOMA processing for STA 200 based on a plurality of STA information portions included in SIG-B, for example.

Further, the power offset values are specified in the table illustrated in FIG. 17 in Method 3-1, for example, and this reduces computational complexity (e.g., computational load) of NOMA control in AP 100 and STA 200.

<Method 3-2>

FIG. 18 illustrates an exemplary format of user information (User field) in SIG-B for DL MU transmissions according to Method 3-2.

The user information illustrated in FIG. 18 includes, for example, NOMA control information (e.g., Beam ID and Tx Power Offset illustrated in FIG. 18) for determining a multiplex power ratio from specified power offset value candidates.

Similar to FIG. 16, the "Beam ID" illustrated in FIG. 18 is, for example, information indicating whether STA 200 is included in a NOMA group corresponding to the Beam ID.

The "Tx Power Offset" illustrated in FIG. 18 indicates, for example, a specified power offset value.

FIG. 19 illustrates an exemplary table illustrating associations between the Tx Power Offset and the specified power offset values (i.e., candidate values).

After determining STAs 200 (i.e., the number of STAs) to be included in a NOMA group, AP 100, for example, selects (i.e., searches) a combination of the power offset values from the table illustrated in FIG. 19, and transmits a DL MU signal including a NOMA signal to STAs 200. At this time, the STA information portions included in the DL MU signal may include, for example, the "Beam ID" indicating the NOMA group and the "Tx Power Offset" indicating the power offset value configured for the corresponding STA 200, as illustrated in FIG. 18.

After receiving the DL MU signal including the STA information portions (see, for example, FIG. 18), STA 200, for example, identifies other STAs included in the same NOMA group as STA 200 and the number of NOMA users based on the Beam ID included in the STA information portions. STA 200 also identifies the power offset values for the respective STAs 200 in the same NOMA group, for example, based on the Tx Power Offsets included in the STA information portions. For example, STA 200 extracts and decodes a desired signal based on the identified NOMA group, the number of NOMA users in the NOMA group, and the power offset values configured for the respective STAs in the NOMA group.

As described above, Method 3-2 allows STA 200 to identify, for example, the NOMA group including STA 200, the number of NOMA users in the NOMA group, and the multiplex power ratio (e.g., power offset values) based on the NOMA control information included in the STA information portions. Thus, Method 3-2 enables STA 200 to appropriately control NOMA processing for STA 200 based on a plurality of STA information portions included in SIG-B, for example.

Further, Method 3-2 allows AP 100 to individually select (i.e., search) the power offset values (i.e., candidates) for a plurality of STAs 200 included in a NOMA group using the table illustrated in FIG. 19, for example. Thus, the power offset value can be appropriately configured for each STA 200 in Method 3-2 as compared to Method 3-1.

Methods 3-1 and 3-2 have been each described, thus far.

For example, the user information (e.g., User Specific field) in FIG. 16 and FIG. 18 may have a fixed-length configuration (e.g., size and Sub field types), as in the case of 11ax. Alternatively, the user information illustrated in FIG. 16 and FIG. 18 may have a variable-length configuration according to a NOMA user or a non NOMA user. In the case where the user information has a variable length, AP 100 may indicate the control information indicating the configuration (e.g., size and Sub field types) of each STA information portion to STA 200. In addition, STA 200 may blindly decode the user information having a variable length according to a NOMA user or a non NOMA user, for example. In the case where STA 200 performs the blind decoding, the control information indicating the configuration of the STA information portion need not be indicated.

Herein, in the case where the STA information portion has a fixed configuration in Method 3-1 (e.g., FIG. 16) and Method 3-2 (e.g., FIG. 18), for example, the signaling amount (i.e., overhead) of the NOMA control information (e.g., Beam ID, and Tx Power Table, Tx Power Offset ID, or Tx Power Offset) included in the STA information portion increases in proportion to the number of multiplexed users in MU transmissions.

In this regard, Methods 3-3 and 3-4 will be each described below as examples of methods for reducing the overhead of the NOMA control information in the STA information portion. Methods 3-3 and 3-4 make it possible to reduce the overhead of the NOMA control information, thereby improving the system performance.

<Method 3-3>

Method 3-3 is a method of indicating a multiplex power ratio for a NOMA group by the arrangement order of STA information portions.

Note that Method 3-3 is based on the format of STA information in Method 3-1 described above (see, for example, FIG. 16), by way of example.

In Method 3-3, AP 100 determines the arrangement order of the STA information portions in SIG-B, for example, according to a multiplex power ratio determined based on radio quality information (e.g., received SINR, average/instantaneous user throughput, pathloss, and SIC computational complexity) of each STA 200.

Figure 20:
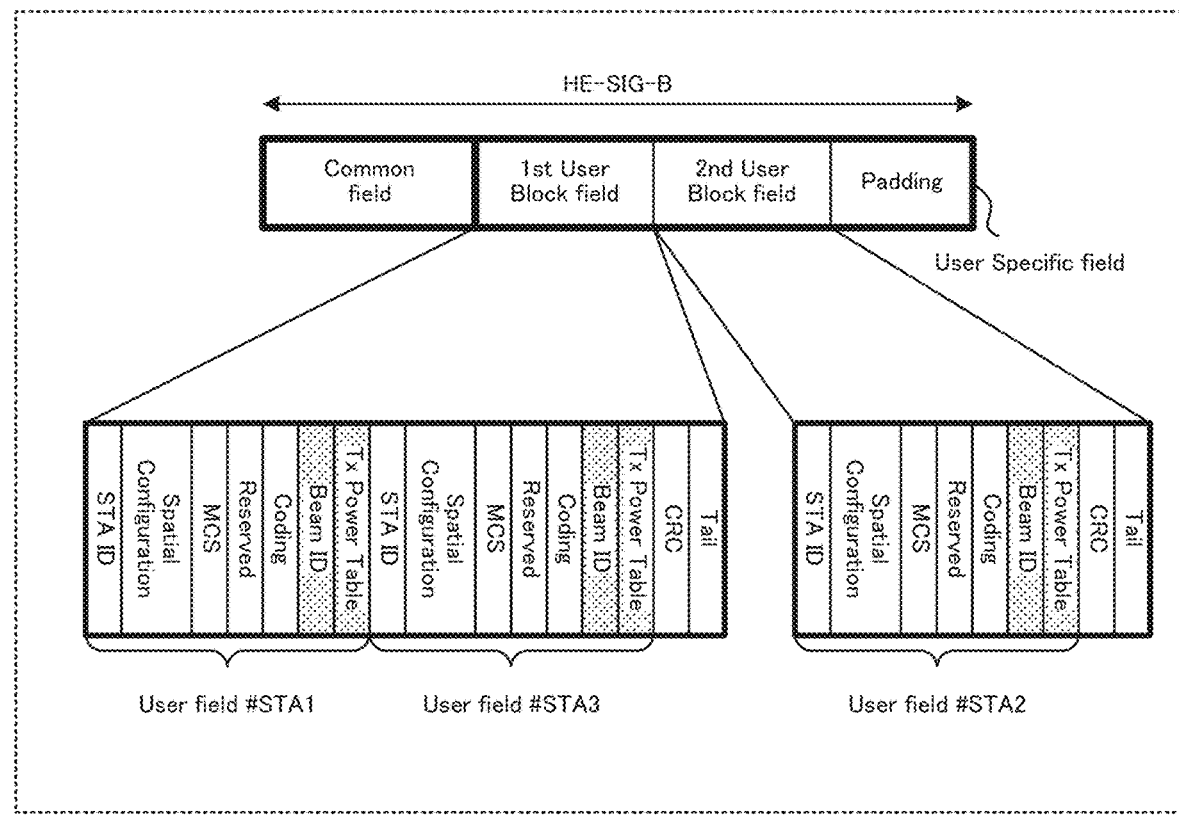
FIG. 20 illustrates an exemplary SIG-B format according to Method 3-3 in Embodiment 3.
Figure 21:
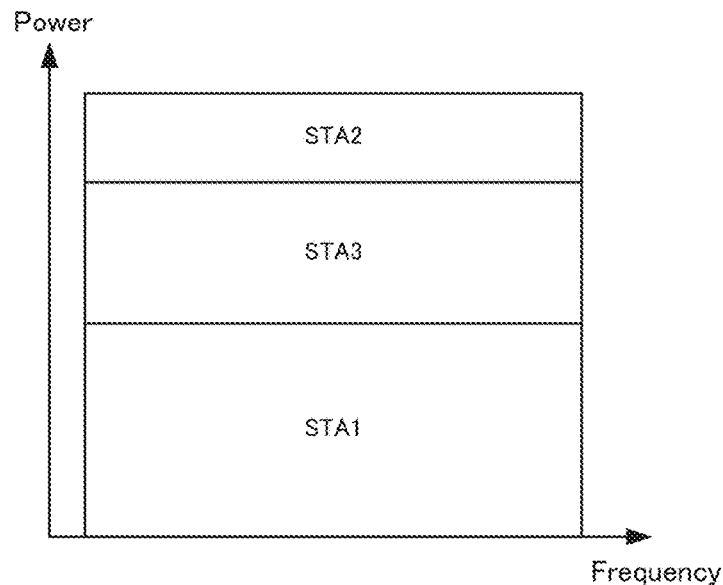
FIG. 21 illustrates exemplary multiplex power allocation according to Method 3-3 in Embodiment 3.

FIG. 20 illustrates an exemplary format of SIG-B in Method 3-3. For example, FIG. 20 indicates the STA information portions in a case where AP 100 transmits a DL MU signal to a NOMA group including STA 1, STA 2, and STA 3 based on the multiplex power ratio (e.g., STA 1>STA 3>STA 2) illustrated in FIG. 21.

As illustrated in FIG. 20, AP 100 maps the STA information portions for the respective STAs 200 in order from the highest allocation power in the multiplex power ratio (e.g., in order of STA 1>STA 3>STA 2). Note that the STA information portion for each STA 200 includes NOMA control information such as the Beam ID and the Tx Power Table, for example. As described above, AP 100 transmits the NOMA control information for each STA 200 in a NOMA group in the order corresponding to the allocation power in NOMA.

STA 200 can determine the position of STA 200 in the order of power offset values in the NOMA group based on the arrangement order of the STA information portions in the user information (e.g., User Specific field) of the received DL MU signal.

For example, STA 200 identifies a NOMA group including STA 200 and the number of NOMA users based on the Beam ID indicated in the STA information portions illustrated in FIG. 20, and identifies a multiplex power ratio corresponding to the Tx Power Table indicated in the STA information portions (see, for example, FIG. 17). Then, STA 200 identifies the power offset values for the respective STAs 200 based on the arrangement order of the STA information portions for the plurality of STAs 200 in the NOMA group.

Thus, Method 3-3 makes it possible to eliminate, for example, the signaling on the "Tx Power Offset ID" in Method 3-1 (see, for example, FIG. 16).

Note that, although FIG. 20 illustrates the case where the STA information portions are mapped in order from the highest allocation power in the multiplex power ratio (i.e., descending order), the present disclosure is not limited to this. The STA information portions may be mapped, for example, in order from the lowest allocation power in the multiplex power ratio (i.e., ascending order; for example, STA 2<STA 3<STA 1 in FIG. 21).

<Method 3-4>

Method 3-4 is a method of replacing spatial stream information (e.g., Spatial Configuration subfield) included in the STA information portion with information on a multiplex power ratio (i.e., NOMA control information).

Signals for STAs 200 included in the same NOMA group are multiplexed by the same beam (i.e., same spatial stream). Thus, the common spatial stream information is configured for STAs 200 included in the same NOMA group. In other words, the same spatial stream information is configured for each of the STA information portions for STAs 200 included in the same NOMA group.

With this regard, in Method 3-4, AP 100 transmits a parameter on spatial multiplexing (e.g., the number of spatial streams) in a period (e.g., Spatial Configuration subfield) for transmitting information on a spatial multiplexing configuration corresponding to a certain STA 200 (e.g., regarded as the first STA) in a NOMA group, and transmits NOMA control information (e.g., information on multiplex power ratio) in the Spatial Configuration subfield corresponding to another STA (e.g., regarded as the second STA) in the NOMA group.

For example, AP 100 maps the STA information portion for STA 200 with the highest allocation power in the multiplex power ratio first in SIG-B. In addition, AP 100 configures the spatial parameter in the STA information portion for STA 200 with the highest allocation power, configures the information on the multiplex power ratio in the STA information portion for another STA 200, and transmits a DL MU signal for the plurality of STAs 200.

STA 200 identifies the number of spatial streams common to NOMA users in the same NOMA group based on the spatial stream information in the STA information portion for the first STA in the NOMA group included in the received DL MU signal. In addition, STA 200 replaces the spatial stream information included in the STA information portion other than the first STA information portion in the NOMA group with the information on the multiplex power ratio.

Note that Method 3-4 is applicable to the formats of the STA information portion in Method 3-1 (see, for example, FIG. 16) and Method 3-2 (see, for example, FIG. 18) described above, by way of example.

Figure 22:
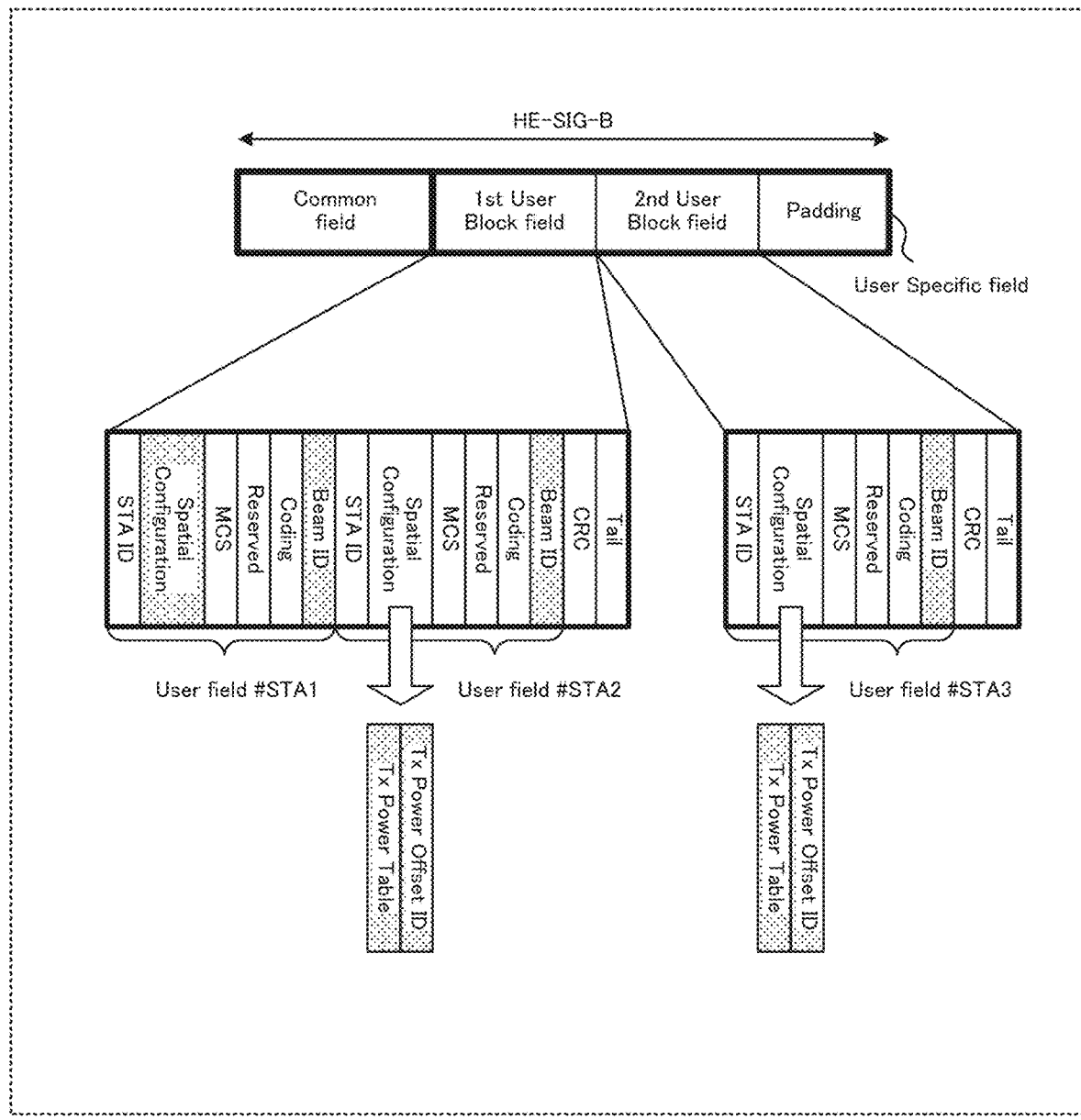
FIG. 22 illustrates an exemplary SIG-B format according to Method 3-4 in Embodiment 3.

FIG. 22 illustrates an exemplary SIG-B format according to Method 3-4.

For example, FIG. 22 illustrates an exemplary case of replacing the spatial stream information with the multiplex power ratio in the format of the STA information in Method 3-1 (FIG. 16). In the example illustrated in FIG. 22, AP 100 transmits a DL MU signal to a NOMA group including STA 1, STA 2, and STA 3 based on the multiplex power ratio (e.g., STA 1>STA 3>STA 2) illustrated in FIG. 21. Thus, the STA information portion for STA 1 with the highest allocation power is mapped first in the User Specific field in FIG. 22.

As illustrated in FIG. 22, information on the number of spatial streams, for example, is transmitted in the Spatial Configuration subfield of the STA information portion for STA 1, which is mapped first in the User Specific field. Meanwhile, as illustrated in FIG. 22, information on the multiplex power ratio (e.g., Tx Power Table and Tx Power Offset ID), for example, is transmitted in the Spatial Configuration subfields of the STA information portions for STA 2 and STA 3 other than the first STA 1 in the User Specific field.

STAs 200 each acquire the information on the multiplex power ratio in the Spatial Configuration subfields of the STA information portions for STA 2 and STA 3 in SIG-B illustrated in FIG. 22. For example, STAs 200 each identify allocation power (e.g., power offset values) in the multiplex power ratio for STA 2 and STA 3 based on the STA information portions for STA 2 and STA 3 illustrated in FIG. 22. Further, each STA 200 may configure the allocation power (e.g., power offset value) in the multiplex power ratio for STA 1 illustrated in FIG. 22 to the largest value in the combination of the power offsets in the Tx Power Table included in the STA information portions for other STAs (e.g., STA 2 and STA 3) in the same NOMA group as STA 1, for example.

Note that Method 3-4 may be combined with Method 3-3 in FIG. 22. For example, in FIG. 22, the STA information portions for a plurality of STAs 200 in a NOMA group may be mapped in order from the highest allocation power in a multiplex power ratio. This allows STA 200 to identify the magnitude relation of the transmit power allocated to STAs 200 in the multiplex power ratio in accordance with the arrangement order of the STA information portions for STAs 200. Thus, STA 200 can identify the power offset values corresponding to the respective STAs 200 in the NOMA group, for example, from the combination of the power offsets in the Tx Power Table indicated by the spatial stream information. This eliminates, for example, signaling on the Tx Power Offset ID illustrated in FIG. 22.

Figure 23:
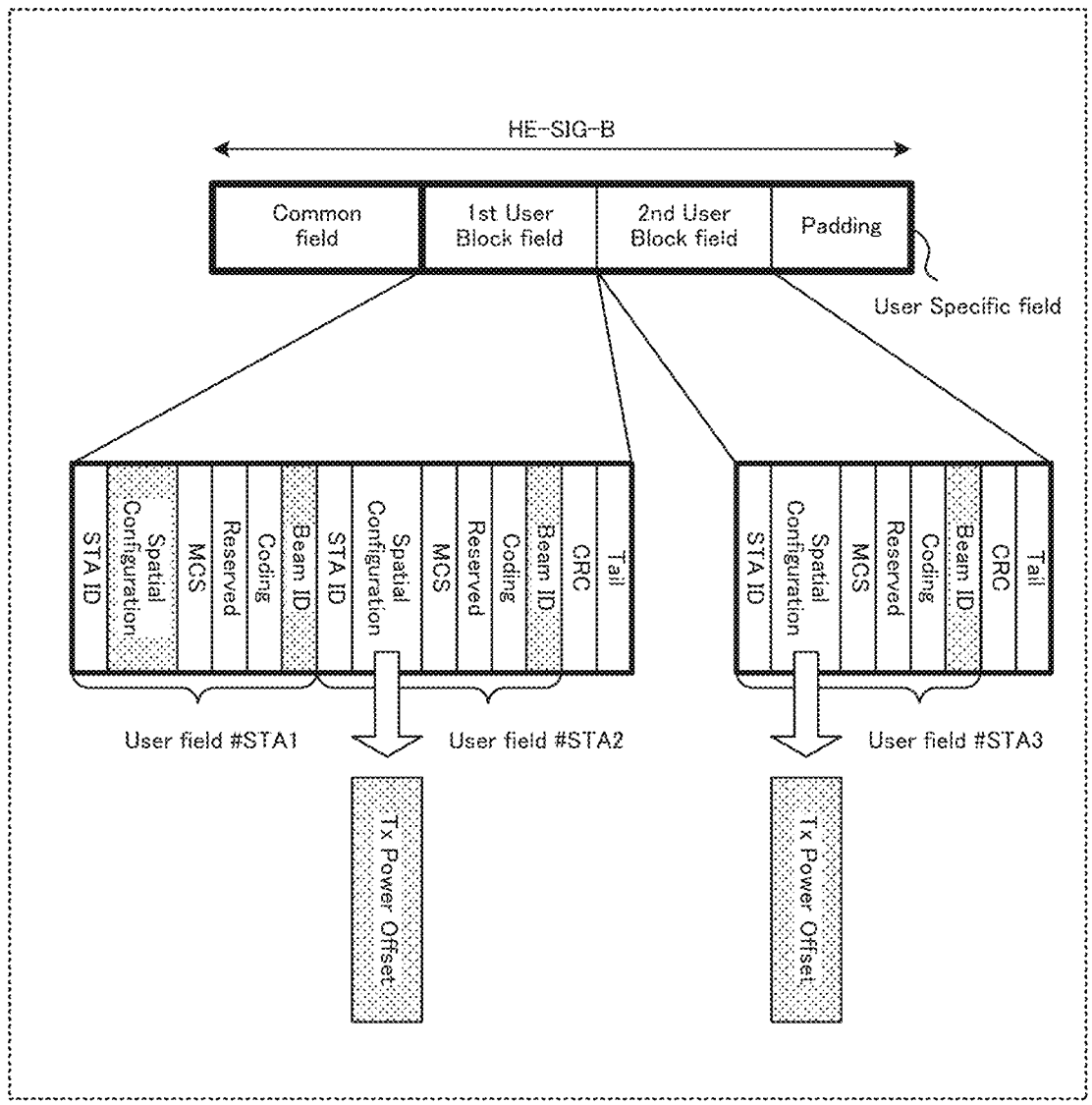
FIG. 23 illustrates another exemplary SIG-B format according to Method 3-4 in Embodiment 3.

Next, FIG. 23 illustrates another exemplary SIG-B format according to Method 3-4.

For example, FIG. 23 illustrates an exemplary case of replacing the spatial stream information with the multiplex power ratio in the format of the STA information in Method 3-2 (FIG. 18). In the example illustrated in FIG. 23, AP 100 transmits a DL MU signal to a NOMA group including STA 1, STA 2, and STA 3 based on the multiplex power ratio (e.g., STA 1>STA 3>STA 2) illustrated in FIG. 21. Thus, the STA information portion for STA 1 with the highest allocation power is mapped first in the User Specific field in FIG. 23.

As illustrated in FIG. 23, information on the number of spatial streams, for example, is transmitted in the Spatial Configuration subfield of the STA information portion for STA 1, which is mapped first in the User Specific field. Meanwhile, as illustrated in FIG. 23, information on the multiplex power ratio (e.g., Tx Power Offset), for example, is transmitted in the Spatial Configuration subfields of the STA information portions for STA 2 and STA 3 other than the first STA 1 in the User Specific field.

STAs 200 each acquire the information on the multiplex power ratio in the Spatial Configuration subfields of the STA information portions for STA 2 and STA 3 in SIG-B illustrated in FIG. 23. For example, STAs 200 each identify allocation power (e.g., power offset values) in the multiplex power ratio for STA 2 and STA 3 based on the STA information portions for STA 2 and STA 3 illustrated in FIG. 23. Further, each STA 200 may configure the allocation power (e.g., power offset value) in the multiplex power ratio for STA 1 illustrated in FIG. 23 to a value obtained by subtracting the sum of the power offsets corresponding to the other STAs (e.g., STA 2 and STA 3) in the same NOMA group as STA 1 from specified transmit power, for example.

As described above, Method 3-4 makes it possible to reduce signaling (i.e., subfields) for indicating information on a multiplex power ratio (e.g., power offset values) in the STA information portions for all STAs.

Note that FIGS. 22 and 23 illustrate the case where AP 100 configures the spatial parameter in the STA information portion for STA 200 with the highest allocation power in a multiplex power ratio, and configures the information on the multiplex power ratio in the STA information portions for the other STAs 200. The STA in a NOMA group for which the spatial parameter is configured, however, is not limited to STA 200 with the highest allocation power, and may be any one of STAs 200 in the NOMA group. For example, AP 100 may configure the spatial parameter in the STA information portion for STA 200 with the lowest allocation power in a multiplex power ratio, and configure the information on the multiplex power ratio in the STA information portions for the other STAs 200.

Methods 3-3 and 3-4 have been each described, thus far.

As described above, the present embodiment allows each STA 200 to appropriately control NOMA processing for STA 200 based on STA information portions for a plurality of STAs 200 included in a single PPDU header (e.g., SIG-B).

Embodiment 4

[Configuration of Radio Communication System]

A radio communication system according to an embodiment of the present disclosure includes at least one AP 300 and a plurality of STAs 400.

In DL communication (e.g., transmission and reception of DL data), for example, AP 300 (or also referred to as a "downlink radio transmission apparatus") performs DL MU transmissions of DL signals to the plurality of STAs 400 (or also referred to as a "downlink radio reception apparatus"). Each of STAs 400 receives a DL signal for the STA 400 from the signals that have been DL MU-transmitted.

In the present embodiment, a description will be given of, for example, methods in which AP 300 controls transmission timings of response signals based on reception processing capability information of each STA 400.

The "reception processing capability information" may be, for example, at least one of information indicating whether STA 400 can extract a desired signal, information indicating whether SIC processing is possible, and information on the time required for reception processing. Note that the reception processing capability information is not limited to such information, and may be other information on the reception processing capability of STA 400.

<Exemplary Configuration of AP 300>

Figure 24:
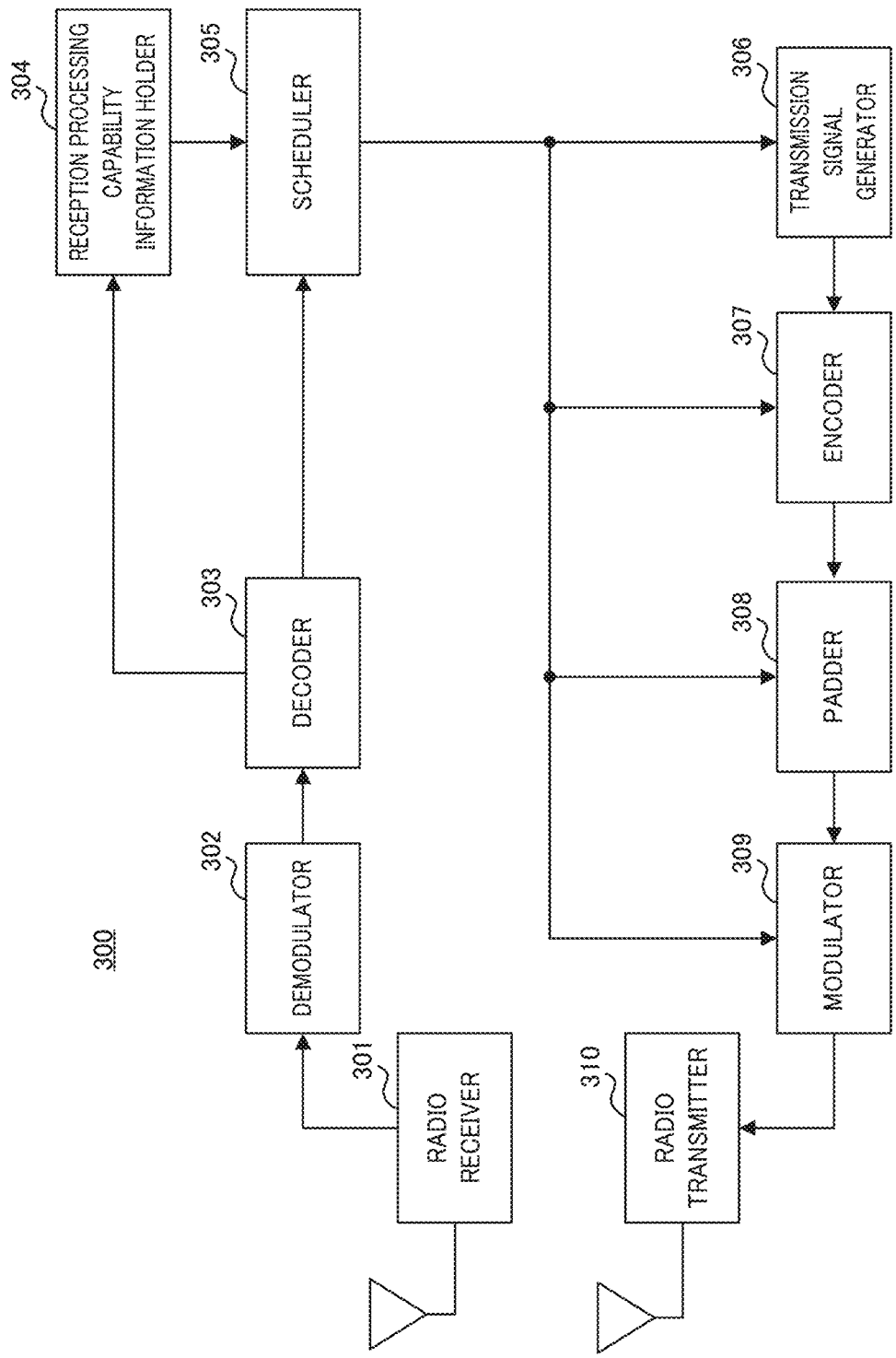
FIG. 24 is a block diagram illustrating an exemplary configuration of an AP according to Embodiment 4.

FIG. 24 is a block diagram illustrating an exemplary configuration of AP 300. AP 300 illustrated in FIG. 24 includes, for example, radio receiver 301, demodulator 302, decoder 303, reception processing capability information holder 304, scheduler 305, transmission signal generator 306, encoder 307, padder 308, modulator 309, and radio transmitter 310.

Radio receiver 301 receives a signal transmitted from STA 400 via an antenna, and performs radio reception processing such as down-conversion and A/D conversion on the received signal. For example, radio receiver 301 extracts a preamble section and a data section from the received signal after the radio reception processing, and outputs the extracted sections to demodulator 302.

Demodulator 302 performs processing such as FFT on the preamble section and the data section inputted from radio receiver 301. Demodulator 302 demodulates the preamble section and the data section, for example, based on the control information (e.g., frequency bandwidth and allocated frequency resource) included in the preamble section and a channel estimation result using a reference signal included in the preamble section, and outputs the demodulated signal to decoder 303.

Decoder 303 decodes the data signal inputted from demodulator 302 based on the control information (e.g., coding method and MCS) inputted from demodulator 302. When the decoded data includes reception processing capability information of STA 400, decoder 303 outputs the reception processing capability information to reception processing capability information holder 304. In addition, when the decoded data includes radio quality information (e.g., channel information or mean SNR for each frequency resource) of STA 400, decoder 303 outputs the radio quality information to scheduler 305.

Reception processing capability information holder 304 holds the reception processing capability information inputted from decoder 303. When AP 300 transmits a NOMA signal to a plurality of STAs 400, for example, reception processing capability information holder 304 outputs the reception processing capability information corresponding to the plurality of STA 400 to scheduler 305.

Scheduler 305 performs NOMA scheduling for STA 400, for example, based on the radio quality information of each STA 400 inputted from decoder 303 and the reception processing capability information of each STA 400 inputted from reception processing capability information holder 304.

For example, scheduler 305 may determine the number of STAs 400 included in a NOMA group (i.e., the number of transmission target terminals or the number of multiplexed users), an MCS, a coding method, an allocated frequency resource, and a frequency bandwidth for DL data.

Scheduler 305 also determines, for example, NOMA group allocation for STA 400, or NOMA control information, such as a multiplex power ratio, to be included in SIG-B, and a PPDU length. In addition, scheduler 305 determines control information including a transmission timing of a response signal (e.g., Acknowledgement (ACK) or Block ACK (BA)) based on the reception processing capability information of STA 400.

Scheduler 305 outputs scheduling information indicating the scheduling result to transmission signal generator 306, encoder 307, padder 308, and modulator 309.

Transmission signal generator 306 generates a data sequence (transmission signal) for STA 400 based on the scheduling information inputted from scheduler 305.

Transmission signal generator 306 outputs the generated data sequence to encoder 307. For example, transmission signal generator 306 may generate a response request signal (e.g., BA Request) for STA 400 transmitting a response signal at a desired timing based on the response signal scheduling information (e.g., response signal transmission timing).

Encoder 307 encodes the data sequence inputted from transmission signal generator 306 based on the scheduling information (e.g., coding method or MCS) inputted from scheduler 305, and outputs the encoded data to padder 308.

Padder 308 performs padding processing on the encoded data inputted from encoder 307 based on the scheduling information (e.g., PPDU length) inputted from scheduler 305. The padding processing includes, for example, Post-Forward Error Correction (Post-FEC) padding and Packet extension (PE). Padder 308 outputs the signal after the padding processing to modulator 309.

Modulator 309 modulates the signal inputted from padder 308, for example, based on the scheduling information (e.g., frequency resource or MCS) inputted from scheduler 305, and outputs the modulated signal to radio transmitter 310. For example, modulator 309 may assign the modulated signal to the radio resource, perform IFFT processing, generate an OFDM signal, and output the signal to radio transmitter 310. In addition, modulator 309 may output, to radio transmitter 310, a multiplexed signal obtained by controlling the power for the modulated signal based on the scheduling information (e.g., multiplex power ratio).

Further, modulator 309 may add a preamble section including, for example, the scheduling information (e.g., the number of multiplexed users, coding method, MCS, frequency bandwidth, allocated frequency resource, and multiplex power ratio) inputted from scheduler 305 to the data section, and output the data section to radio transmitter 310.

Radio transmitter 310 performs radio transmission processing, such as D/A conversion, and up-conversion for a carrier frequency, on a radio frame including the data section and the preamble section inputted from modulator 309, and transmits the signal after the radio transmission processing to STA 400 via the antenna.

<Exemplary Configuration of STA 400>

Figure 25:
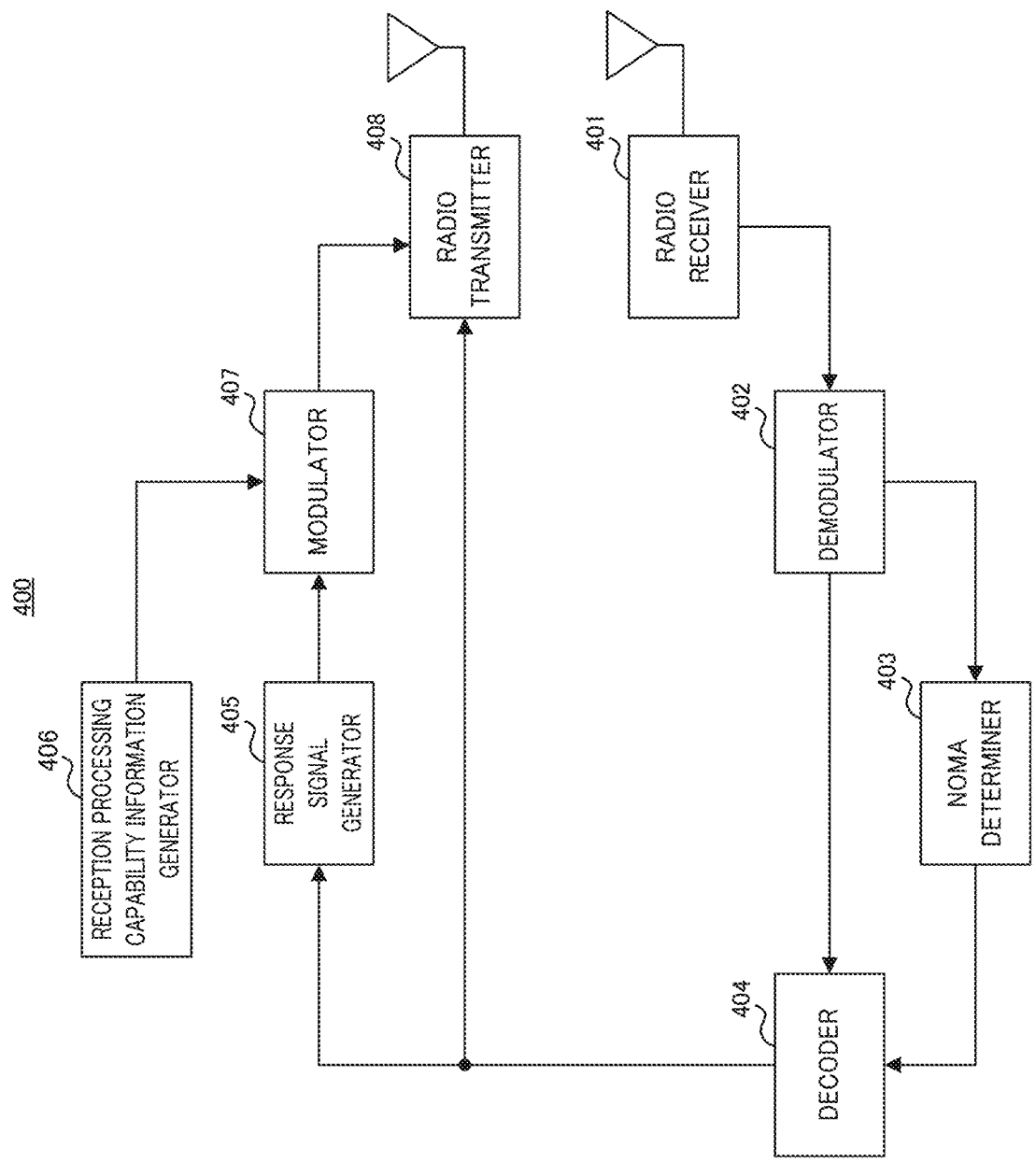
FIG. 25 is a block diagram illustrating an exemplary configuration of an STA according to Embodiment 4.

FIG. 25 is a block diagram illustrating an exemplary configuration of STA 400. STA 400 illustrated in FIG. 25 includes, for example, radio receiver 401, demodulator 402, NOMA determiner 403, decoder 404, response signal generator 405, reception processing capability information generator 406, modulator 407, and radio transmitter 408.

Radio receiver 401 performs radio reception processing such as down-conversion and A/D conversion on a signal received via an antenna. Radio receiver 401 extracts a preamble section and a data section from the signal after the radio reception processing, and outputs the extracted sections to demodulator 402.

Demodulator 402 performs processing such as FFT on the preamble section and the data section inputted from radio receiver 401. Demodulator 402 demodulates the data section and the preamble section, for example, based on the control information (e.g., frequency bandwidth and allocated frequency resource) included in the demodulated preamble section and a channel estimation result using a reference signal included in the preamble section, and outputs the demodulated signal to decoder 404. In addition, demodulator 402 outputs the control information included in the preamble section to NOMA determiner 403 and decoder 404.

NOMA determiner 403 determines whether the demodulated data demodulated in demodulator 402 is multiplexed by NOMA based on the control information inputted from demodulator 402. In other words, NOMA determiner 403 determines whether STA 200 is a NOMA user. NOMA determiner 403 outputs the NOMA determination result to decoder 404. Decoder 404 extracts desired data from the demodulated data inputted from demodulator 402 based on the NOMA determination result inputted from NOMA determiner 403 and the control information inputted from demodulator 402, and decodes the desired data.

For example, decoder 404 decodes the demodulated data based on the control information (e.g., multiplex power ratio, coding method, or MCS) when the NOMA determination result indicates that the signal is a NOMA signal (i.e., multiplexed by NOMA).

When STA 400 can perform SIC processing, for example, decoder 404 may perform the SIC processing. For example, decoder 404 compares allocation power based on STA information portions (e.g., multiplex power ratios) for other users included in the same NOMA group as STA 400. When there is a user (another STA) with allocation power higher than that of STA 400, for example, decoder 404 demodulates and decodes a signal for another STA, and performs error determination such as CRC, based on the STA information portion (e.g., multiplex power ratio, coding method, MCS, or frequency resource) for another STA. When the error determination result indicates no error, decoder 404 generates a signal replica based on the STA information portion (e.g., multiplex power ratio, coding method, MCS, or frequency resource) for another STA by multiplying, by a channel estimate, a signal obtained by encoding and modulating the decoded signal. Decoder 404 extracts and decodes a signal for STA 400 by subtracting the generated signal replica from the data section. Note that a domain where the signal replica is subtracted from the data section may be the time domain or the frequency domain. When there are a plurality of users with allocation power higher than that of STA 400, decoder 404 may extract the signal for STA 400 by generating a signal replica by the SIC processing in order from an STA with highest allocation power and subtracting the signal replica from the demodulated data.

Further, when the NOMA determination result does not indicate that the signal is a NOMA signal (i.e., multiplexed by NOMA signal), for example, decoder 404 decodes the demodulated data based on the control information (e.g., coding method or MCS).

Decoder 404 also performs error detection such as CRC on the decoded data, and outputs the error detection result to response signal generator 405. In addition, decoder 404 outputs the response request signal (e.g., BA Request) included in the decoded data to radio transmitter 408.

When the error detection result inputted from decoder 404 indicates no error, response signal generator 405 generates a response signal addressed to AP 300, and outputs the signal to modulator 407. When the error detection result indicates an error, response signal generator 405 does not perform (i.e., stops) transmission of the response signal.

Reception processing capability information generator 406 generates reception processing capability information indicating the reception processing capability of STA 400, and outputs the generated information to modulator 407. The reception processing capability information may be transmitted in a management frame body (e.g., beacon frame), for example.

Modulator 407 performs processing such as IFFT processing or modulation on the response signal inputted from response signal generator 405 or on the reception processing capability information inputted from reception processing capability information generator 406, and generates a modulated signal (e.g., referred to as a data signal or an OFDM signal). In addition, modulator 407 generates a radio frame (i.e., packet signal), which is the data signal with a preamble section added, and outputs the radio frame to radio transmitter 408.

Radio transmitter 408 performs radio transmission processing, such as D/A conversion, and up-conversion for a carrier frequency, on the radio frame inputted from modulator 407, and transmits the signal after the radio transmission processing to AP 300 via the antenna. Note that, in a case of transmitting a response signal, radio transmitter 408 transmits the response signal based on the response intervals (e.g., duration subfield) indicated in the response request signal inputted from decoder 404, for example.

[Exemplary Operations of AP and STA]

Next, exemplary operations of AP 300 and STA 400 according to the present embodiment will be described.

For example, AP 300 determines transmission timings of response signals (e.g., ACK or BA) to data signals by a plurality of STAs 400 multiplexed by MU-MIMO or OFDMA, based on information on a NOMA signal reception processing capability of each of the plurality of STAs 400.

Figure 26:
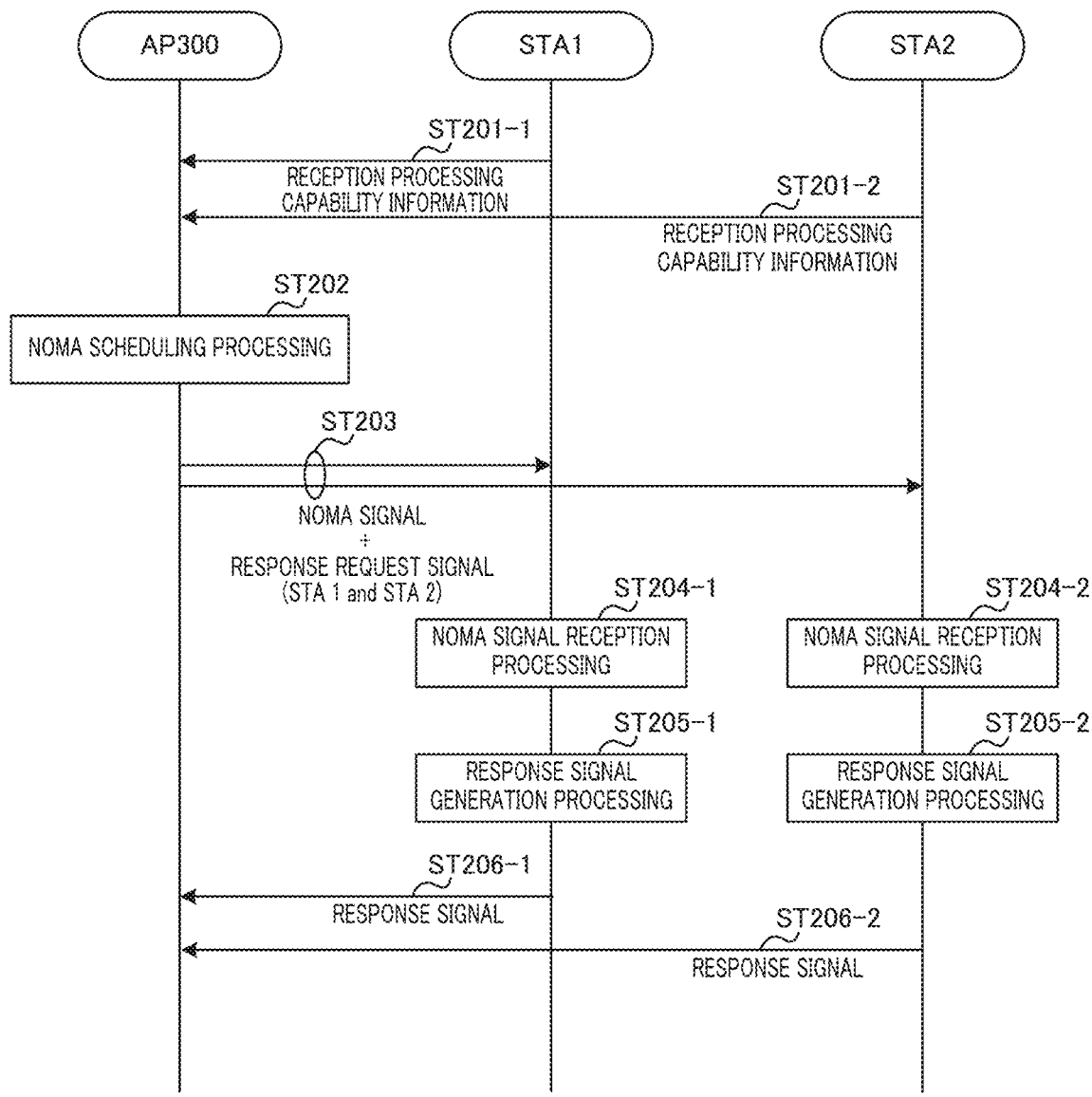
FIG. 26 is a sequence diagram describing an exemplary operation of a radio communication system according to Embodiment 4.

FIG. 26 is a sequence diagram describing an exemplary operation of a radio communication system.

FIG. 26 illustrates an exemplary operation of MU transmissions including a NOMA signal in AP 300 and two STAs 400 (e.g., STA 1 and STA 2), by way of example. Note that the number of users to be spatially multiplexed or frequency-multiplexed is not limited to two in the MU transmissions, and may be three or more. Further, the number of users to be power-multiplexed by NOMA is not limited to two in the MU transmissions, and may be three or more.

In FIG. 26, STA 1 and STA 2 transmit reception processing capability information portions respectively indicating the reception processing capabilities of STA 1 and STA 2 to AP 300 (ST201-1 and ST201-2). The reception processing capability information portions may be transmitted to AP 300 in UL transmission (e.g., beacon frame), for example, AP 300 acquires the reception processing capability information portions respectively transmitted from STA 1 and STA 2, and stores the information portions in a buffer (e.g., reception processing capability information holder 304).

AP 300 performs scheduling processing for each STA (ST202). When performing DL MU transmissions (e.g., MU-MIMO or OFDMA) to a NOMA group including STA 1 and STA 2, for example, AP 300 determines transmission timings of response signals for the DL MU transmissions based on the reception processing capability information portions of STA 1 and STA 2. For example, AP 300 may control the transmission timings of the response signals by determining the transmission order of the response signals for STAs in a NOMA group, as in Method 4-1 to be described later. Further, AP 300 may control the transmission timings of the response signals by extending the PPDU length in the DL MU transmissions with padding processing (e.g., PE), for example, as in Method 4-2 to be described later.

AP 300 transmits a DL MU signal including a NOMA signal to STA 1 and STA 2, for example, based on NOMA control information (e.g., scheduling information on NOMA) included in the control information (e.g., SIG-B) (ST203).

Note that response request signals (e.g., BA Request) for indicating the transmission timings of the response signals may be included in the DL MU signal, or may be transmitted to STA 1 and STA 2 by a radio frame other than the DL MU signal (e.g., see FIG. 27 and FIG. 28 to be described later).

STA 1 and STA 2 perform reception processing on the DL MU signal (e.g., NOMA signal) (ST204-1 and ST204-2). For example, STA 1 and STA 2 identify the STA information for each STA based on SIG-B included in the DL MU transmissions.

Further, STA 1 and STA 2 may respectively extract the signals addressed to STA 1 and STA 2 from the data section of the received signal, and decode the signals, for example, based on the information on a multiplex power ratio included in the STA information. When STA 400 is capable of performing SIC processing, for example, STA 400 may extract and decode a signal addressed to STA 400 by generating a signal replica of a signal for another STA for which a Beam ID common to STA 400 is configured and to which power higher than allocation power of STA 400 is allocated in the STA information, and subtracting the signal replica from the data section.

STA 1 and STA 2 perform error detection on the received signal based on CRC, for example, and generate response signals when no error is detected (ST205-1 and ST205-2). STA 1 and STA 2 generate (i.e., transmit) no response signal when an error is detected, for example.

In the case of generating the response signals, STA 1 and STA 2 transmit the response signals to AP 300 based on the transmission timings indicated by the response request signals transmitted from AP 300, for example (ST206-1 and ST206-2). STA 1 and STA 2 may transmit a response signal multiplexed by UL MU or UL OFDMA to AP 300. AP 300 receives the response signals respectively transmitted from STA 1 and STA 2 based on the response signal transmission timings respectively determined for STA 1 and STA 2, for example.

Next, Methods 4-1 an 4-2 will be each described as examples of a method of controlling the transmission timings of the response signals.

<Method 4-1>

In Method 4-1, AP 300 requests response signals in descending order of the reception processing capabilities of STAs 400 in a NOMA group. In other words, a later transmission timing of a response signal is configured for STA 400 with lower reception processing capability.

For example, AP 300 determines the transmission order of the response signals to data signals by a plurality of STAs 400 based on the NOMA signal reception processing capability information of each of the plurality of STAs 400, and transmits, to STAs 400, information (e.g., response request signals) on the transmission timings according to the determined transmission order.

In a case where the reception processing capability information indicates how many times SIC processing can be performed within a specified time, for example, AP 300 determines the transmission timings of the response signals in order from STA 400 that can perform the SIC processing the most, and transmits the response request signals including the information on the determined transmission timings to STAs 400.

Figure 27:
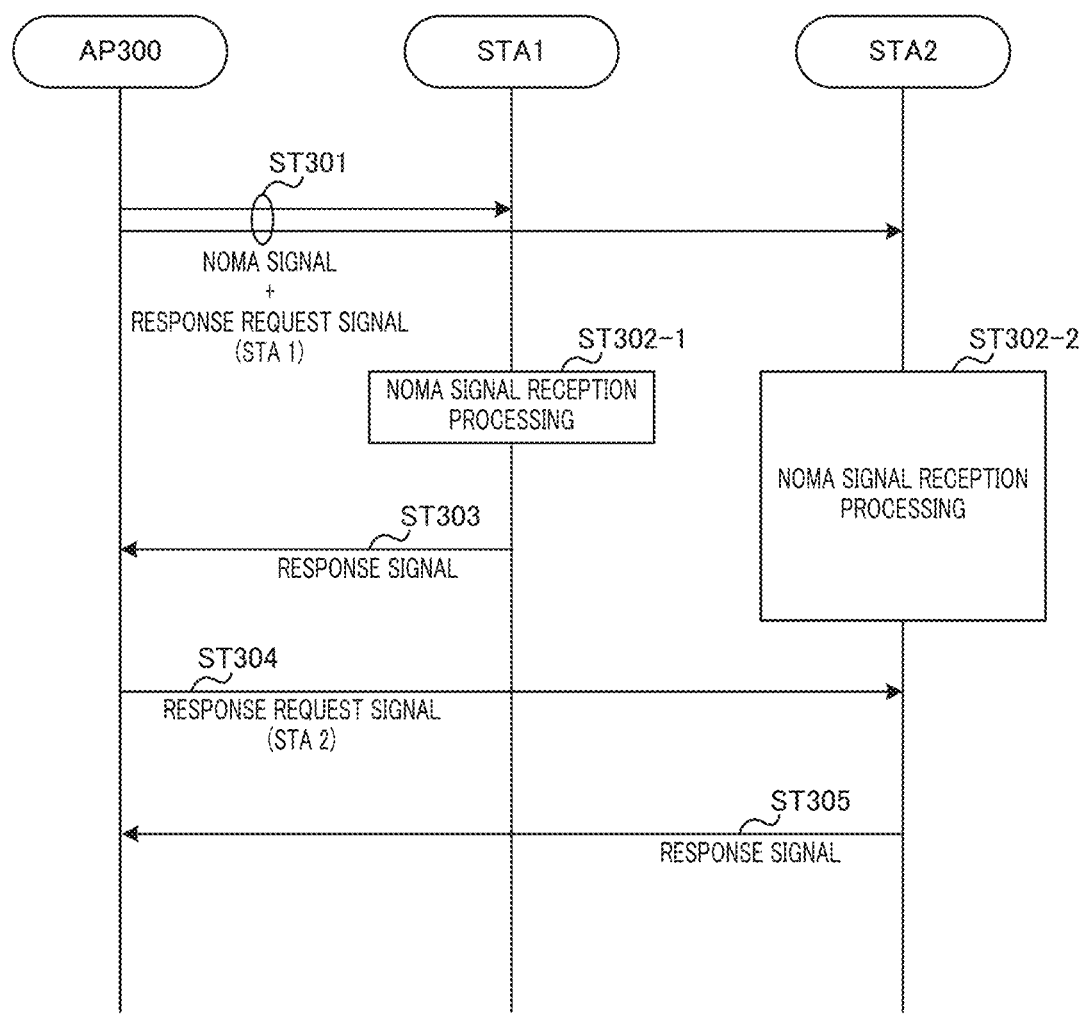
FIG. 27 is a sequence diagram describing an exemplary operation of a radio communication system according to Method 4-1 in Embodiment 4.

Note that AP 300 may transmit, to STAs 400 (e.g., STA 1 and STA 2), the response request signals including the information on the transmission timings of the response signals of STAs 400 in different radio frames, for example, as illustrated in FIG. 27. For example, the reception processing capability of STA 1 is higher than that of STA 2 in FIG. 27. As illustrated in FIG. 27, AP 300 transmits a NOMA signal to STA 1 and STA 2 including a response request signal including information on the transmission timing of the response signal for STA 1 (ST301). In other words, AP 300 does not include a response request signal for STA 2 in the NOMA signal. STA 1 and STA 2 perform reception processing on the NOMA signal (ST302-1 and ST302-2).

In FIG. 27, STA 1 transmits the response signal for the received NOMA signal (e.g., data signal) to AP 300 based on the transmission timing indicated in the response request signal (ST303).

Further, AP 300 transmits a response request signal including information on the transmission timing of the response signal for STA 2 at a timing different from the transmission timing of the NOMA signal (e.g., process of ST301) (ST304). Note that the transmission processing of the response request signal for STA 2 is not limited to being performed at the timing illustrated in FIG. 27, and may be performed at a timing after the process of ST301 and before the process of ST303, for example, STA 2 transmits the response signal for the received NOMA signal (e.g., data signal) to AP 300 based on the transmission timing indicated in the response request signal (ST305).

Figure 28:
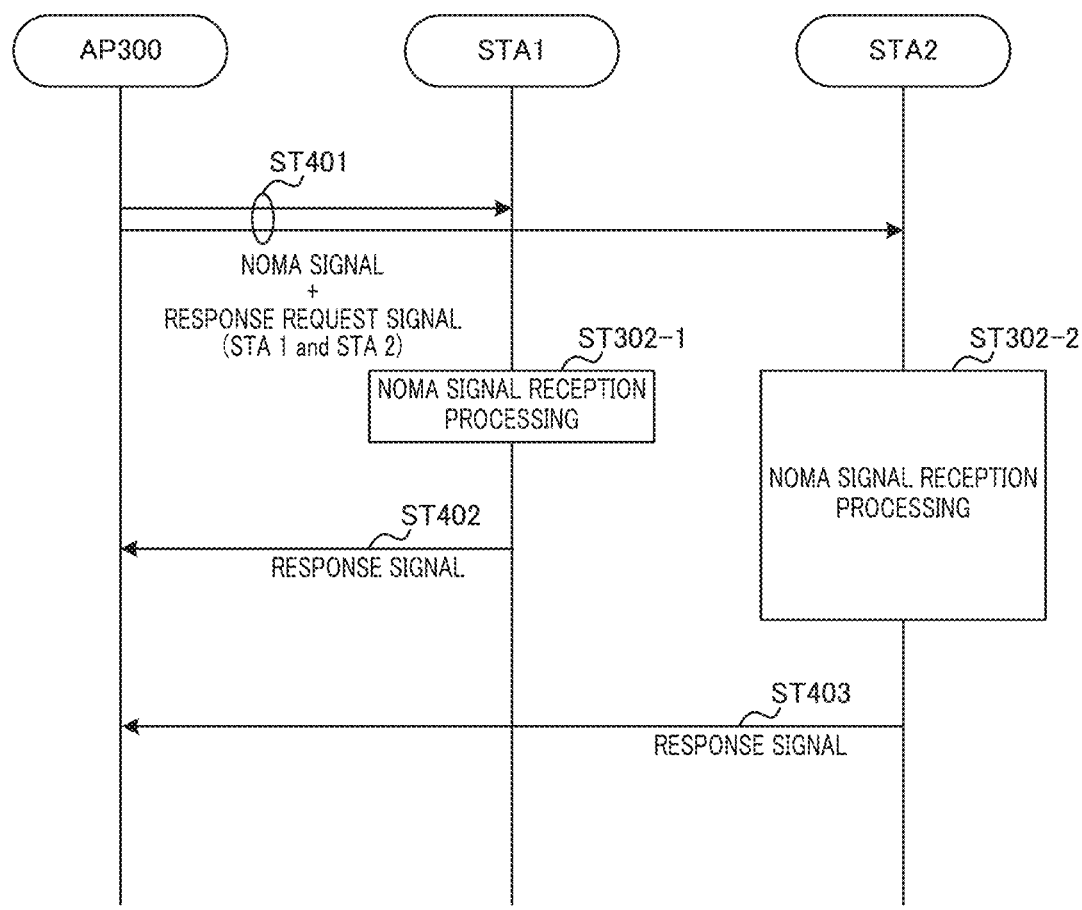
FIG. 28 is a sequence diagram describing another exemplary operation of the radio communication system according to Method 4-1 in Embodiment 4.

Alternatively, AP 300 may transmit, to a plurality of STAs 400 (e.g., STA 1 and STA 2), the response request signals including the information on the transmission timings of the response signals of STAs 400 in the same radio frame (e.g., NOMA signal), for example, as illustrated in FIG. 28. Note that, in FIG. 28, the same processes as those in FIG. 27 are denoted by the same reference signs, and descriptions thereof are omitted.

For example, the reception processing capability of STA 1 is higher than that of STA 2 in FIG. 28. As illustrated in FIG. 28, AP 300 transmits a NOMA signal to STA 1 and STA 2 including response request signals including information on the transmission timings of the response signals for both STA 1 and STA 2 (ST401).

Then, STA 1 transmits the response signal to the received NOMA signal (e.g., data signal) to AP 300 based on the transmission timing indicated in the response request signal, in FIG. 28 (ST402). Likewise, STA 2 transmits the response signal to the received NOMA signal (e.g., data signal) to AP 300 based on the transmission timing indicated in the response request signal (ST403).

As described above, AP 300 determines the transmission timings of the response signals according to the reception processing capabilities of STAs 400 in Method 4-1. For example, a later transmission timing of a response signal is configured for STA 400 with lower reception processing capability, and this secures a longer period for the reception processing (e.g., processing of extracting a desired signal from a NOMA signal) in STA 400 with lower reception processing capability. Consequently, STAs 400 can prevent the case of failing to transmit a response signal due to the delay of the reception processing in STAs 400.

<Method 4-2>

In DL MU transmissions, signals for a plurality of STAs 400 included in a NOMA signal, for example, are subjected to padding processing so as to have the same length.

In Method 4-2, AP 300 determines a PPDU length based on STA 400 with the lowest reception processing capability in a NOMA group, for example.

In other words, AP 300 determines transmission timings of response signals to data signals by a plurality of STAs 400, by adjusting (e.g., extending) the length of a PPDU to be transmitted to the plurality of STAs 400 based on NOMA signal reception processing capability information of each of the plurality of STAs 400.

For example, AP 300 may determine the PPDU length for the plurality of STAs 400 based on STA 400 with the lowest reception processing capability. For example, AP 300 may extend the PPDU length so that STA 400 with the lowest reception processing capability can transmit a response signal at a specified interval (e.g., Short Inter-Frame Space (SIFS)). For example, AP 300 may perform padding processing (e.g., PE or Post-FEC Padding) on signals for the plurality of STAs 400 based on the determined PPDU length.

Figure 29:
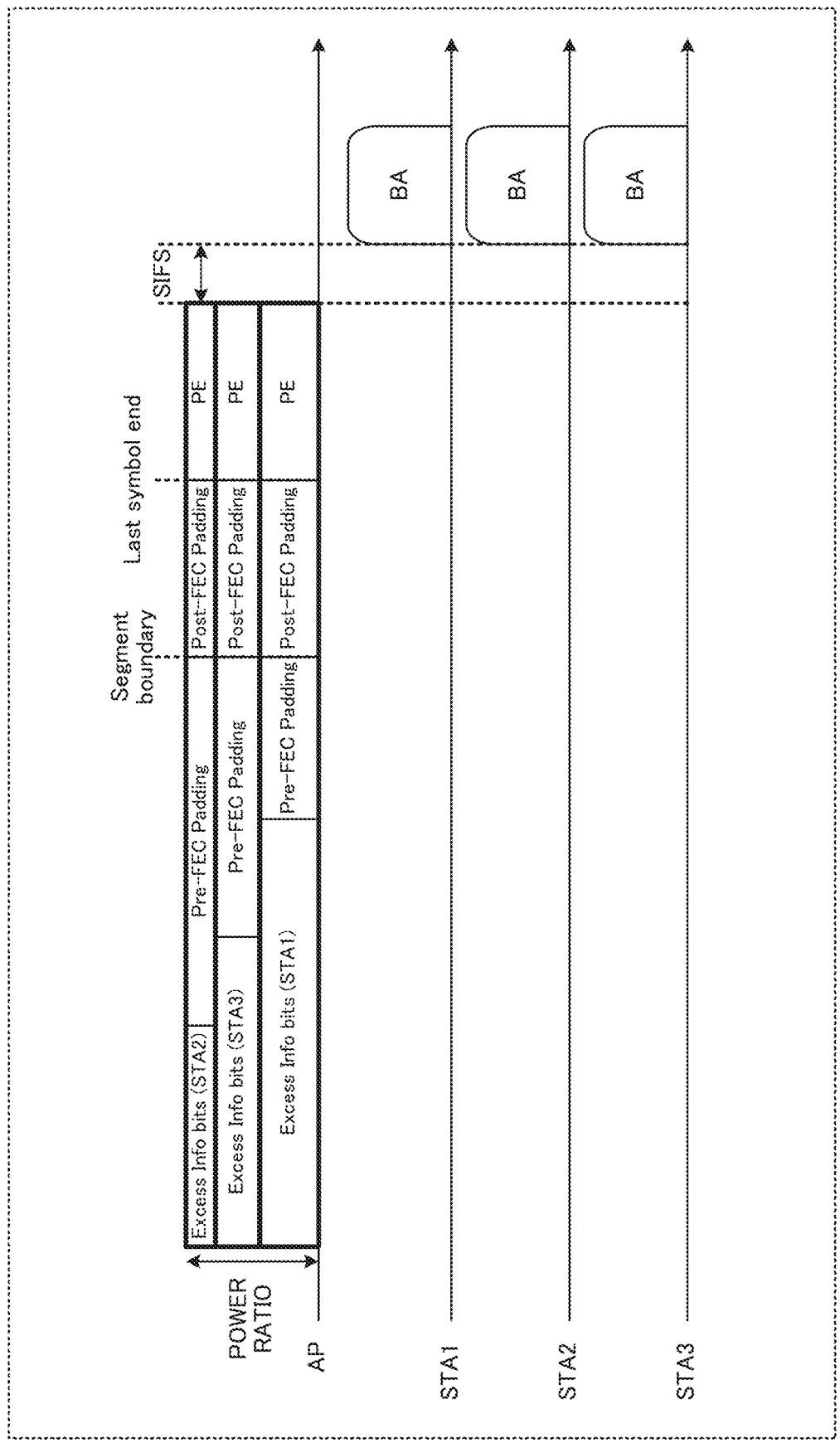
FIG. 29 illustrates exemplary control of transmission timings according to Method 4-2 in Embodiment 4.

FIG. 29 illustrates an example of determining the PPDU length based on STA 400 with the lowest reception processing capability in Method 4-2.

In FIG. 29, AP 300 transmits a NOMA signal with the number of NOMA users=3 (e.g., STA 1, STA 2, and STA 3).

In FIG. 29, the "Excess Info bits" included in the NOMA signal are extra data bits shorter than a single OFDM symbol length, and have different lengths for different STAs 400.

The "Pre-FEC Padding" illustrated in FIG. 29 is a padding bit added to the Excess Info bits of each STA 400 before encoding. AP 300 performs padding processing from the end of the Excess Info bits to the closest segment boundary, for example.

The "Post-FEC Padding" illustrated in FIG. 29 is a padding bit added after encoding. AP 300 performs padding processing to the last symbol end of an OFDM symbol so as to form a single OFDM symbol including the Excess Info bits and the Pre-FEC Padding, for example.

The "PE" illustrated in FIG. 29 is padding processing for STA 400 to transmit a response signal to AP 300 with the SIFS. After receiving DL MU transmissions, STA 400 transmits a response signal to AP 300 in UL MU transmissions after the SIFS.

AP 300 may add a length greater than or equal to the length of 1 OFDM symbol to the PPDU by the Post-FEC Padding, for example. For example, AP 300 may add, to the PPDU, the Post-FEC Padding with a length of OFDM symbols longer than the "Last symbol end" (e.g., OFDM symbol boundary closer to a signal after the Pre-FEC Padding) illustrated in FIG. 29. For example, AP 300 may add, to the PPDU, the Post-FEC Padding with an integer symbol length in addition to the Post-FEC Padding to the "Last symbol end" illustrated in FIG. 29. In this case, the entire OFDM symbol of the integer symbols from the end of the signal for each STA 400 is the Post-FEC Padding.

AP 300 may also determine capability information on the PE (e.g., nominal packet padding or PPE threshold) according to the reception processing capability information, for example.

In Method 4-2, the PPDU length in DL MU transmissions is determined according to STA 400 with the lowest reception processing capability in a NOMA group, as described above. For example, extending the PPDU length secures a longer period for the reception processing (e.g., processing of extracting a desired signal from a NOMA signal) in STA 400 with the lowest reception processing capability. This prevents STAs 400 from failing to transmit a response signal due to the delay of the reception processing in STAs 400.

Note that, although the description has been given of the case of determining the PPDU length based on STA 400 with the lowest reception processing capability in a NOMA group, STA 400 serving as a reference for determining the PPDU length is not limited to STA 400 with the lowest reception processing capability.

Methods 4-1 and 4-2 have been each described, thus far.

The present embodiment allows STA 400 to, for example, transmit a response signal at a transmission timing corresponding to the reception processing capabilities of STAs 400 in a NOMA group. For example, STA 400 with lower reception processing capability can transmit a response signal at a later transmission timing. This prevents STA 400 from failing to complete the reception processing for a DL MU signal before the transmission timing of a response signal, and failing to transmit the response signal, for example.

Embodiments of the present disclosure have been each described, thus far.

Other Embodiments

An AP (e.g., AP 100 or AP 300) may control resource allocation so as not to assign a NOMA user and a non NOMA user on the same frequency resource (e.g., RU). In Embodiment 2, for example, when the NOMA control information identifying a NOMA group assigned to a frequency resource is indicated by the frequency resource allocation information (e.g., RU Allocation subfield), the AP does not assign a NOMA user and a non NOMA user to the same RU. At this time, the Beam ID can indicate a type of a NOMA group even when Beam ID=0, thereby increasing the maximum number of NOMA groups that can be indicated. In other words, the maximum multiplex number of NOMA groups can be increased in a case of MU-MIMO NOMA.

2. Information identifying a NOMA group is not limited to the Beam ID. For example, the information identifying a NOMA group may be information identifying STAs to which the same RU and the same beam are applied (hereinafter referred to as an "STA number"). In other words, the STA number is information on the number of STAs in a NOMA group (i.e., the number of NOMA multiplexes).

Figure 30:
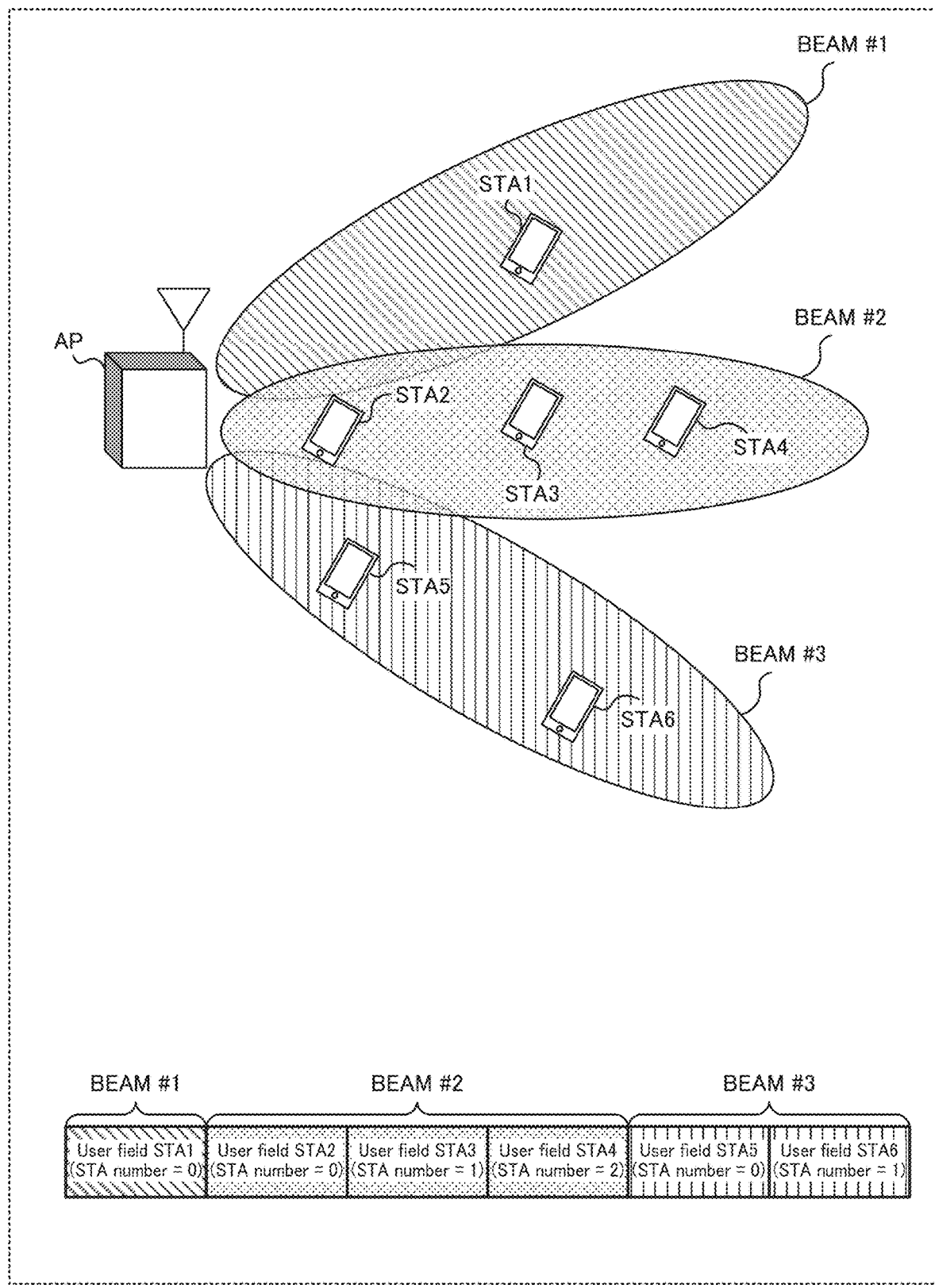
FIG. 30 illustrates examples of MU MIMO NOMA and STA information portions according to another embodiment.

FIG. 30 illustrates an exemplary configuration of MU-MIMO NOMA and an exemplary configuration of user information (e.g., User Specific field of SIG-B) including the STA number in a case of using the STA number.

The STA information portions (User fields) are arranged in order of the beam numbers, for example. The STA information portions respectively include the STA numbers. The STA number may be, for example, in the number of bits that can represent the maximum number of NOMA multiplexes expected in the system. For example, the number of bits for the STA number may be 1 bit when the maximum number of NOMA multiplexes is 2.

A NOMA group determination method by an STA (STA 200 or STA 400) will be described below.

For example, when the STA number of STA information #(n+1) is increased from the STA number of STA information #n, the STA determines that the STA with STA information #n and the STA with STA information #(n+1) are in the same NOMA group (have the same Beam ID). Meanwhile, when the STA number of STA information #(n+1) is decreased from or equal to the STA number of STA information #n, the STA determines that the STA with STA information #n and the STA with STA information #(n+1) are in different NOMA groups (have different Beam IDs).

In the example illustrated in FIG. 30, for example, the STA number of the STA information for STA 1 is 0, and the STA number of the STA information for the following STA 2 is 0. Thus, the STA determines that STA 1 and STA 2 are in different NOMA groups.

Further, in the example illustrated in FIG. 30, for example, the STA number of the STA information for STA 2 is 0, the STA number of the STA information for the following STA 3 is 1, the STA number of the STA information for the following STA 4 is 2, and the STA number of the STA information for the following STA 5 is 0. Thus, the STA determines that STA 2, STA 3, and STA 4 are in the same NOMA group, and that STA 5 is in a NOMA group different from the NOMA group of STA 2, STA 3, and STA 4. Likewise, the STA determines that STA 5 and STA 6 are in the same NOMA group in the example illustrated in FIG. 30.

In addition, the STA number may be assigned in order (e.g., descending or ascending order) of allocation power in a multiplex power ratio in NOMA within a NOMA group. In this case, the STA can identify the magnitude relation of the allocation power in the multiplex power ratio in NOMA based on the STA number (or the arrangement order of the STA information) configured in the STA information for each of the STAs in the NOMA group. Thus, information on the order of the multiplex power ratio (e.g., Tx Power Offset ID) can be eliminated from the User field, as in Method 3-3 of Embodiment 3, for example.

3. The AP may determine the multiplex power ratio in a NOMA group, for example, based on the reception processing capability information in addition to the radio quality information of STAs.

In a case of NOMA using the SIC processing, for example, a higher multiplex power ratio (e.g., highest multiplex power ratio) may be configured for the STA with lower reception processing capability (e.g., STA that can perform less times of the SIC processing within a specified time) or for the STA with no reception processing capability (e.g., SIC processing capability).

Configuring a high multiplex power ratio for the STA with lower reception processing capability makes it less likely for the STA to perform the SIC processing, and the STA can directly decode the received data. In other words, the STA can reduce the reception processing such as the SIC processing.

4. In each of Embodiments 1 to 4, NOMA with non-orthogonal multiplexing based on a multiplex power ratio has been described. Embodiment 3 (e.g., Methods 3-1 to 3-4) is, however, also applicable to another NOMA based on the SIC, for example.

In a case of Multi-User Shared Access (MUSA), which is a type of NOMA, for example, the AP multiplexes signals subjected to spreading processing using a non-orthogonal spreading code on the same frequency resource, and transmits the signals.

The AP adds information on an identifier (e.g., Beam ID) of a NOMA group, a spreading factor, and a non-orthogonal spreading code, for example, to each STA information. The non-orthogonal spreading code includes, for example, a different pattern for each STA. The AP performs the spreading processing on data based on the spreading factor and the non-orthogonal spreading code of the STA information, and multiplexes the data on the same frequency resource.

Further, the AP may change the spreading factor for each STA, for example. The AP may also perform the spreading processing on a plurality of symbols with different non-orthogonal spreading codes respectively for a data section of a single STA.

Each STA extracts a signal addressed to the STA by the SIC processing based on the STA information included in the received signal. For example, the STA demodulates and decodes a signal for another STA having the same Beam ID as that of the STA, and performs error determination such as CRC based on the STA information (e.g., coding method, MCS, frequency resource, spreading factor, or non-orthogonal spreading code) for another STA. When no error is detected, the STA generates a signal replica by multiplying, by a channel estimate, a signal obtained by encoding and modulating the decoded signal for another STA based on the STA information (e.g., coding method, MCS, frequency resource, spreading factor, or non-orthogonal spreading code) for another STA. The STA extracts and decodes a signal addressed to the STA by subtracting the generated signal replica from a data section of the received signal.

In a case where the spreading factor differs for each STA, the smaller the spreading factor is, the greater the transmit power per band is. Thus, the STA may eliminate signals corresponding to other STAs by the SIC processing in descending order of the spreading factors. Note that, when the spreading factors are equal among STAs, the transmit power per band is also equal, and thus the SIC processing may be performed in any order.

5. Although the above embodiments have provided descriptions of exemplary configurations based on the format of a control signal for MU transmissions in 11ax as an example, the format to which an embodiment of the present disclosure is applied is not limited to the format in 11ax. An embodiment of the present disclosure can be applied to, for example, MU transmissions controlled using common information and user information.

6. Any of Embodiments 1 to 3 (e.g., operation on NOMA group identification) and Embodiment 4 (e.g., operation on transmission control of response signals) may be applied in combination.

7. The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g. cellular (cell) phone, smart phone), a tablet, a personal computer (PC) (e.g. laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an embodiment of the present disclosure includes: control circuitry, which, in operation, generates information on a terminal group among a plurality of terminals, the terminal group being a target of transmission by non-orthogonal multiplexing; and transmission circuitry, which, in operation, transmits the information on the terminal group during a period for transmitting control information addressed to the plurality of terminals.

In an embodiment of the present disclosure, the information on the terminal group includes information indicating whether each of the plurality of terminals is the target of the transmission by the non-orthogonal multiplexing.

In an embodiment of the present disclosure, the information on the terminal group includes a value different for each of a plurality of the terminal groups.

In an embodiment of the present disclosure, the transmission circuitry transmits the information on the terminal group during a period for transmitting common information for the plurality of terminals within the period for transmitting the control information.

In an embodiment of the present disclosure, the information on the terminal group includes information indicating whether the terminal group is assigned to a frequency resource indicated in the common information.

In an embodiment of the present disclosure, the information on the terminal group includes information indicating a number of the terminals included in the terminal group in a frequency resource indicated in the common information.

In an embodiment of the present disclosure, the transmission circuitry transmits specific information portions for the plurality of terminals in the terminal group in order according to allocation power in the non-orthogonal multiplexing, during a period for transmitting the specific information portions within the period for transmitting the control information.

In an embodiment of the present disclosure, the information on the terminal group is associated with some frequency resource candidate values among a plurality of frequency resource candidates in allocation information of a frequency resource indicated in the common information.

In an embodiment of the present disclosure, the transmission circuitry transmits the information on the terminal group during a period for transmitting specific information portions for the plurality of terminals in the terminal group within the period for transmitting the control information.

In an embodiment of the present disclosure, the transmission circuitry transmits the information on the terminal group for each of the plurality of terminals in the terminal group in order according to allocation power in the non-orthogonal multiplexing.

In an embodiment of the present disclosure, the transmission circuitry transmits a parameter on spatial multiplexing in a period for transmitting information on a spatial multiplexing configuration corresponding to a first terminal in the terminal group, and transmits the information on the terminal group in a period for transmitting the information on the spatial multiplexing configuration corresponding to a second terminal in the terminal group.

A base station according to an embodiment of the present disclosure includes: control circuitry, which, in operation, determines transmission timings of response signals to data signals by the plurality of terminals based on information on a non-orthogonal multiplex signal reception processing capability of each of the plurality of terminals; and transmission circuitry, which, in operation, transmits information on the transmission timings.

A terminal according to an embodiment of the present disclosure includes: reception circuitry, which, in operation, receives information on a terminal group that is non-orthogonally multiplexed, during a period for receiving downlink control information, and control circuitry, which, in operation, controls reception of a downlink non-orthogonal multiplex signal based on the information on the terminal group.

A terminal according to an embodiment of the present disclosure includes: reception circuitry, which, in operation, receives information on a transmission timing of a response signal to a data signal, the transmission timing being a timing based on a non-orthogonal multiplex signal reception processing capability; and transmission circuitry, which, in operation, transmits the response signal based on the transmission timing.

In a communication method according to an embodiment of the present disclosure, a base station generates information on a terminal group among a plurality of terminals, the terminal group being a target of transmission by non-orthogonal multiplexing, and transmits the information on the terminal group during a period for transmitting control information addressed to the plurality of terminals.

In a communication method according to an embodiment of the present disclosure, a base station determines transmission timings of response signals to data signals by the plurality of terminals based on information on a non-orthogonal multiplex signal reception processing capability of each of the plurality of terminals, and transmits information on the transmission timings.

In a communication method according to an embodiment of the present disclosure, a terminal receives information on a terminal group that is non-orthogonally multiplexed, during a period for receiving downlink control information, and controls reception of a downlink non-orthogonal multiplex signal based on the information on the terminal group.

In a communication method according to an embodiment of the present disclosure, a terminal receives information on a transmission timing of a response signal to a data signal, the transmission timing being a timing based on a non-orthogonal multiplex signal reception processing capability, and transmits the response signal based on the transmission timing.

The disclosure of Japanese Patent Application No. 2019-100587, filed on May 29, 2019, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST 100, 300 AP
101, 201, 301, 401 Radio receiver
102, 202 Preamble demodulator
103, 203 Data demodulator
104, 205 Data decoder
105, 305 Scheduler
106 Data generator
107, 307 Encoder
108, 207, 309, 407 Modulator
109 Preamble generator
110, 208, 310, 408 Radio transmitter
200, 400 STA
204, 403 NOMA determiner
206 Radio quality information generator
302, 402 Demodulator
303, 404 Decoder
304 Reception processing capability information holder
306 Transmission signal generator
308 Padder
405 Response signal generator
406 Reception processing capability information generator

The invention claimed is:

1. A base station, comprising:
control circuitry, which, in operation,
generates information on a terminal group among a plurality of terminals, the terminal group being a target of transmission by non-orthogonal multiplexing, and
generates a non-orthogonal multiplex access (NOMA) signal, wherein a length of the NOMA signal is determined based on a terminal with a lowest reception processing capability among the plurality of the terminals; and
transmission circuitry, which, in operation, transmits the information on the terminal group during a period for transmitting common information for the plurality of terminals, wherein:
the period for transmitting the common information for the plurality of terminals is during a period for transmitting control information addressed to the plurality of terminals, and
the information on the terminal group is associated with some frequency resource candidate values among a plurality of frequency resource candidates in allocation information of a frequency resource indicated in the common information.

2. The base station according to claim 1, wherein the information on the terminal group includes information indicating whether each of the plurality of terminals is the target of the transmission by the non-orthogonal multiplexing.

3. The base station according to claim 1, wherein the information on the terminal group includes a value different for each of a plurality of terminal groups.

4. The base station according to claim 1, wherein the information on the terminal group includes information indicating whether the terminal group is assigned to the frequency resource indicated in the common information.

5. The base station according to claim 1, wherein the information on the terminal group includes information indicating a number of the terminals included in the terminal group in the frequency resource indicated in the common information.

6. The base station according to claim 1, wherein the transmission circuitry, in operation, transmits specific information portions for the plurality of terminals in the terminal group in order according to allocation power in the non-orthogonal multiplexing, during a period for transmitting the specific information portions within the period for transmitting the control information.

7. The base station according to claim 1, wherein the transmission circuitry, in operation, transmits the information on the terminal group during a period for transmitting specific information portions for the plurality of terminals in the terminal group within the period for transmitting the control information.

8. The base station according to claim 7, wherein the transmission circuitry, in operation, transmits the information on the terminal group for each of the plurality of terminals in the terminal group in order according to allocation power in the non-orthogonal multiplexing.

9. The base station according to claim 1, wherein,
the control circuitry, in operation, determines transmission timings of response signals to data signals by the plurality of terminals based on information on a non-orthogonal multiplex signal reception processing capability of each of the plurality of terminals, and
the transmission circuitry, in operation, transmits information on the transmission timings.

10. A terminal, comprising:
reception circuitry, which, in operation, receives information on a terminal group among a plurality of terminals that is non-orthogonally multiplexed, during a period for receiving common information for the plurality of terminals, wherein the period for receiving the common information for the plurality of terminals is during a period for receiving downlink control information addressed to the plurality of terminals, and receives a non-orthogonal multiplex access (NOMA) signal, wherein a length of the NOMA signal is determined based on a terminal with a lowest reception processing capability among the plurality of the terminals; and control circuitry, which, in operation, controls reception of a downlink non-orthogonal multiplex signal based on the information on the terminal group, wherein the information on the terminal group is associated with some frequency resource candidate values among a plurality of frequency resource candidates in allocation information of a frequency resource indicated in the common information.

11. The terminal according to claim 10, wherein the reception circuitry, in operation, receives information on a transmission timing of a response signal to a data signal, the transmission timing being a timing based on a non-orthogonal multiplex signal reception processing capability, and wherein, the terminal comprises transmission circuitry, which, in operation, transmits the response signal based on the transmission timing.

12. A communication method, comprising:

generating, by a base station, information on a terminal group among a plurality of terminals, the terminal group being a target of transmission by non-orthogonal multiplexing;

generating a non-orthogonal multiplex access (NOMA) signal, wherein a length of the NOMA signal is determined based on a terminal with a lowest reception processing capability among the plurality of the terminals;

transmitting, by the base station, the information on the terminal group during a period for transmitting common information for the plurality of terminals, wherein the period for transmitting the common information for the plurality of terminals is during a period for transmitting control information addressed to the plurality of terminals; and transmitting the NOMA signal, wherein the information on the terminal group is associated with some frequency resource candidate values among a plurality of frequency resource candidates in allocation information of a frequency resource indicated in the common information.

13. A communication method, comprising:

receiving, by a terminal, information on a terminal group among a plurality of terminals that is non-orthogonally multiplexed, during a period for receiving common information for the plurality of terminals, wherein the period for receiving the common information for the plurality of terminals is during a period for receiving downlink control information addressed to the plurality of terminals;

receiving a non-orthogonal multiplex access (NOMA) signal, wherein a length of the NOMA signal is determined based on a terminal with a lowest reception processing capability among the plurality of the terminals; and controlling, by the terminal, reception of a downlink non-orthogonal multiplex signal based on the information on the terminal group, wherein the information on the terminal group is associated with some frequency resource candidate values among a plurality of frequency resource candidates in allocation information of a frequency resource indicated in the common information.

* * * * *